United States Patent [19]
Aoyama et al.

[11] Patent Number: 5,836,666
[45] Date of Patent: Nov. 17, 1998

[54] ELECTRONIC CALCULATING APPARATUS

[75] Inventors: Takaharu Aoyama, Koganei; Kazuhiko Arikawa, Fussa; Teiji Sindo, Hamura; Mitsuru Okano, Fussa, all of Japan

[73] Assignee: Casio Computer Co., Ltd., Tokyo, Japan

[21] Appl. No.: 622,652

[22] Filed: Mar. 26, 1996

[30] Foreign Application Priority Data

Mar. 31, 1995 [JP] Japan ..................................... 7-097651
Mar. 31, 1995 [JP] Japan ..................................... 7-097672

[51] Int. Cl.[6] ................................................ G03B 21/14
[52] U.S. Cl. ..................................... 353/122; 353/DIG. 3
[58] Field of Search .............................. 353/122, DIG. 3, 353/119; 349/58

[56] References Cited

U.S. PATENT DOCUMENTS

| | | |
|---|---|---|
| 4,154,007 | 5/1979 | Judd . |
| 4,846,694 | 7/1989 | Erhadt .................................... 353/122 |
| 4,944,578 | 7/1990 | Denison ................................. 353/122 |
| 5,035,502 | 7/1991 | Stokes . |
| 5,041,965 | 8/1991 | Chen ...................................... 353/122 |
| 5,168,294 | 12/1992 | Davis et al. . |
| 5,373,333 | 12/1994 | Kawada et al. ......................... 353/122 |
| 5,392,081 | 2/1995 | Tarnay et al. ........................... 353/122 |
| 5,455,905 | 10/1995 | Kaya et al. . |

FOREIGN PATENT DOCUMENTS

WO 94/23405  10/1994  WIPO .

OTHER PUBLICATIONS

IEEE Spectrum, No. 12, Dec. 1991, New York, p. 6 XP000276475, "Innovations: Writing On The Wall".

Primary Examiner—William Dowling
Attorney, Agent, or Firm—Frishauf, Holtz, Goodman, Langer & Chick

[57] ABSTRACT

An electronic calculating apparatus for use with an overhead projector and a projection screen includes an electronic calculator and a display device. The electronic calculator comprises a data input unit and a data sending unit. The electronic calculator performs an operation corresponding to data inputted from the data input unit, and displays a result of the performed operation. The display device comprises a liquid crystal display unit of a transparent type and a data receiving unit for receiving data sent from the sending unit of the electronic calculator. The display device is placed on the top of the overhead projector, and, upon receipt of the data sent from the data sending unit of the electronic calculator, the display device performs an operation that is substantially the same as the operation performed by the electronic calculator, and displays the result of the performed operation on the liquid crystal display unit of a transparent type. The result of the operation displayed on the liquid crystal display unit of a transparent type is enlarged and projected through the overhead projector onto the projection screen.

16 Claims, 25 Drawing Sheets

| FIXED DATA | DEVICE/ DATA DATA | REAL DATA | CHECK SUM |
|---|---|---|---|
| 4bit | 8bit | 8bit | 2bit |

5,836,666

ELECTRONIC CALCULATING APPARATUS

BACKGROUND OF THE INVENTION

1. Field of the Invention

The present invention relates to an electronic calculating apparatus including at least two devices, between which data can be exchanged using a radio communication and a data processing method used therein, and, more particularly, relates to an electronic calculating apparatus used together with an overhead projector and a projection screen, which apparatus includes at least two devices, one of which devices is provided with a transparent type liquid crystal display unit and is placed on the top of the overhead projector for enlarging and projecting a displayed data onto the projection screen, and a data processing method used in the electronic apparatus.

2. Description of the Prior Art

In U.S. Pat. Nos. 4,154,007 and 5,035,502, there are disclosed electronic calculators which have a transparent body or a transparent display unit, and which are used together with an overhead projector and a projection screen. The electronic apparatus is placed on the overhead projector for projecting onto the projection screen an indication displayed on the transparent display unit thereof. Onto the projection screen are enlarged and projected the indication corresponding to data inputted to the electronic apparatus as well as a manipulation of the electronic apparatus executed by a user.

The electronic apparatus is often used by teachers in a class room at school to teach students how data inputted to the electronic apparatus are displayed on the display unit thereof and/or how to manipulate the electronic apparatus.

The above conventional electronic apparatus has a data input unit connected with the transparent display unit. Therefore, the user of the apparatus has to stay in the vicinity thereof to manipulate the electronic apparatus, and further has to manipulate the apparatus with extreme care not to move same.

SUMMARY OF THE INVENTION

The present invention has been made to overcome the above mentioned inconvenience of the conventional apparatus, and has an object to provide an electronic calculating apparatus and data processing method of enlarging and projecting an indication onto a projection screen. A user of the electronic calculating apparatus can manipulate same to input data without any special care, and receives no limitation on a space for manipulation of the same.

According one aspect of the invention, there is provided an electronic calculating apparatus, which comprises:

an electronic calculator; and a display device, wherein:
said electronic calculator comprises:
input means for inputting data;
sending means for sending data inputted by said input means using a radio frequency wave;
first processing means for performing an operation based on the data inputted by said input means; and
first display means for displaying a result of the operation performed by said first processing means, and wherein:
said display device comprises:
receiving means for receiving data sent from said sending means of the electronic calculator;
second processing means for performing an operation which is substantially the same as the operation performed by said first processing means of the electronic calculator; and
second display means having a liquid crystal display unit of a transparent type, for displaying on the liquid crystal display unit of a transparent type a result of the operation performed by said second processing means.

BRIEF DESCRIPTION OF THE DRAWINGS

Other objects and structures of the present invention will be more fully understood from the description, when taken in conjunction with the accompanying drawings, in which.

DETAILED DESCRIPTION OF PREFERRED EMBODIMENTS

Now, preferred embodiments of the present invention will be described in detail with reference to the accompanying drawings.

Now, embodiments of an electronic apparatus according to the present invention will be described with reference to the accompanying drawings.

Figure 1:
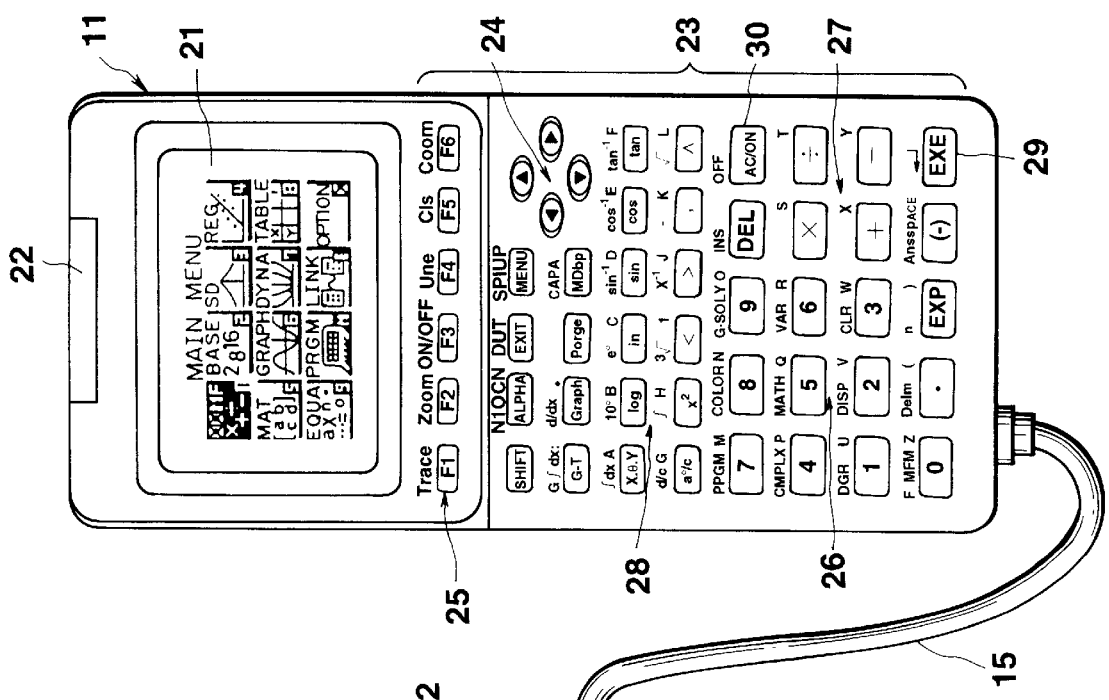
FIG. 1 is an external view of a first embodiment of an electronic calculating apparatus according to the present invention.
Figure 1:
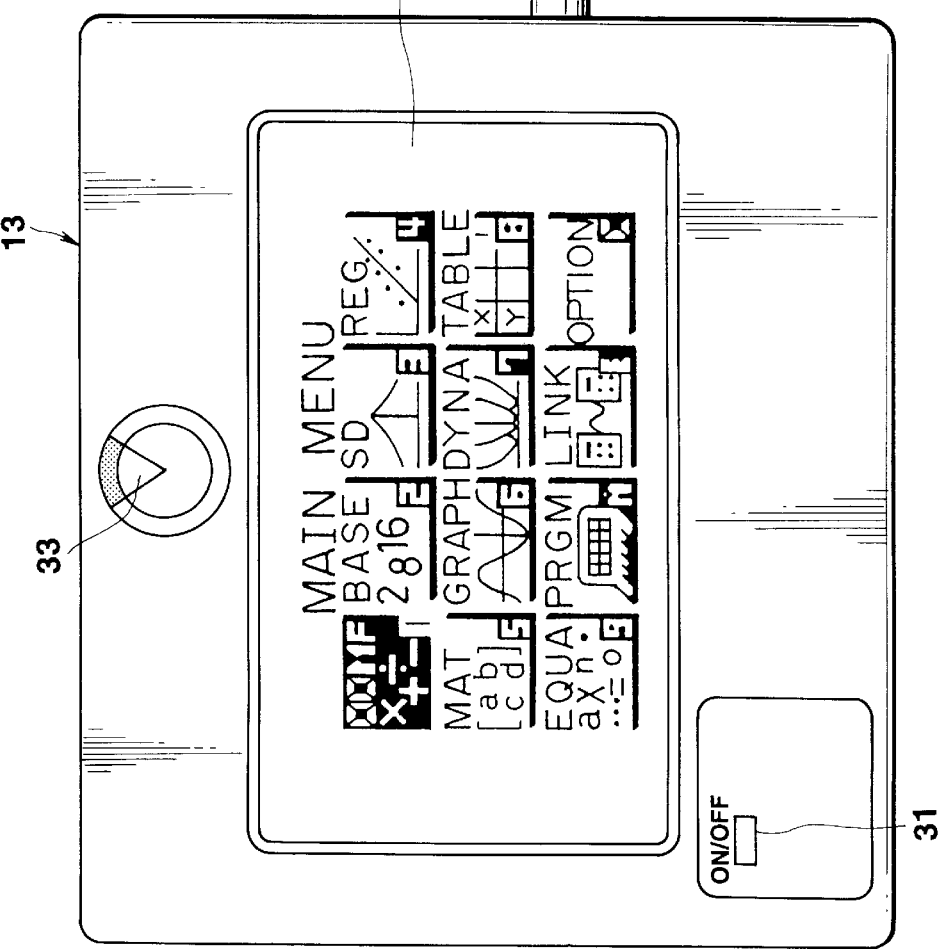

FIG. 1 is a view showing a structure of a first embodiment of the electronic apparatus of the present invention. As shown in FIG. 1, the electronic apparatus of the present invention comprises a compact size electronic calculator 11 (hereafter, sometimes simply electronic calculator) and a display device 1 3 which displays an indication similar to an indication displayed on a display unit of the compact size electronic calculator 11.

The compact size electronic calculator 11 is of a palm top size, and is provided with a display unit 2 1, a communication unit 22, and a key input unit 23 for inputting data. The display unit 21 has a liquid crystal display panel. The communication unit 22 has an infrared ray communication unit, and exchanges data with the display device 13. The key input unit 23 includes cursor keys 24, function designating keys 25 for designating a function, numeral keys 26 for inputting numeral data, operation keys 27 for inputting operation signs, function keys 28, and execution key 29 and a power key 30.

The display device 13 is provided with a power switch 31, a display unit 32 having a comparably large size liquid crystal display panel, and a communication unit 33 which is rotatably mounted on the display device 13. A cable 15 serves to transfer back-up data stored in the compact size electronic calculator 11 to the display device 13, when the display device 13 is turned on.

Figure 2:
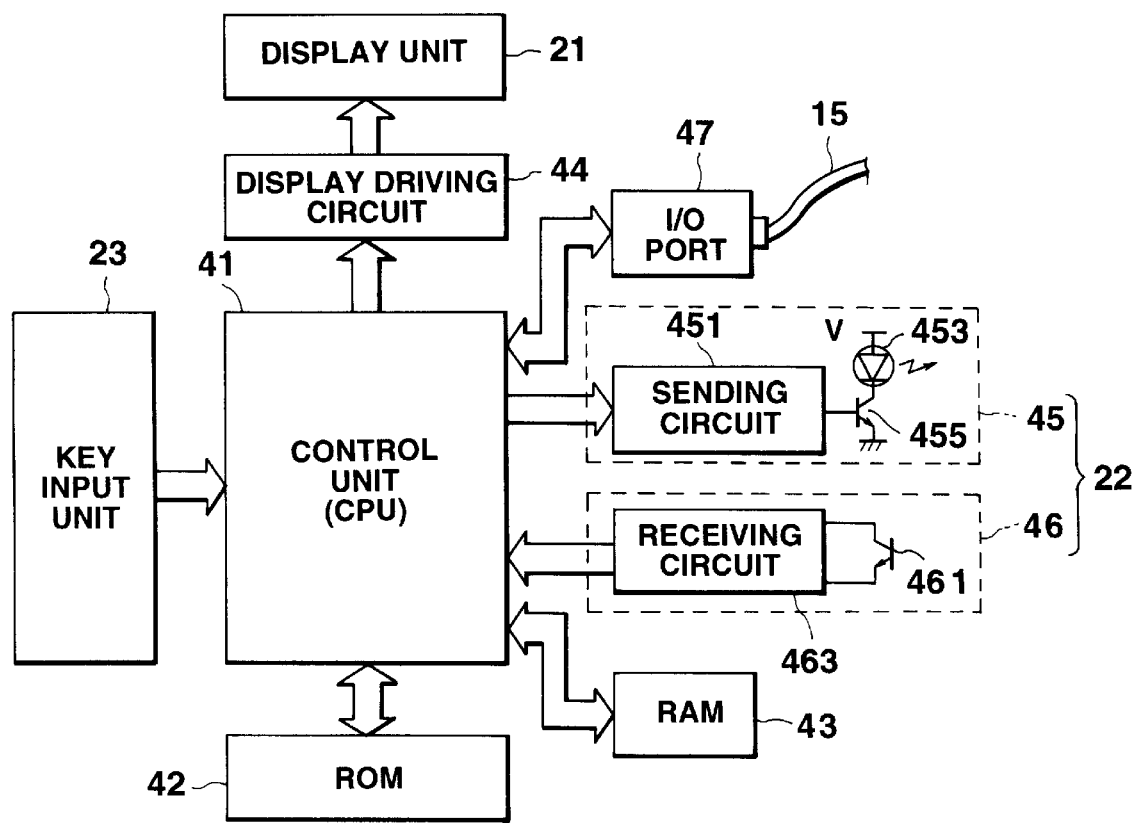
FIG. 2 is a circuit diagram of the first embodiment of the electronic calculating apparatus of the invention.

FIG. 2 is a circuit diagram of the compact size electronic calculator 11. As shown in FIG. 2, the compact size electronic calculator 11 comprises a control unit 41, a key input unit 23 connected to the control unit 41, a read only memory (ROM) 42, a random access memory (RAM) 43, a display driving circuit 44, a sending unit 45, a receiving unit 46, and an I/O port 47. The display driving circuit 44 is connected with the display unit 21.

The control unit 41 comprises a central processing unit (CPU) and peripheral circuits of the CPU, and controls entire operations of the compact size electronic calculator 11 in accordance with a program stored in the ROM 42.

The ROM 42 stores therein fixed data and programs such as an operation program, a control program, and a display program. The RAM 43 is backed up to maintain data stored therein even though the power is turned off, and is provided with a display register 431, a mode register 432, a communication flag register 433, an automatic power off setting time register (APO setting time register) 434, an automatic power off timer (APO timer) 435, a graph memory unit 436, a register 437 for each mode, and a work area 438.

The display register 431 stores images in bit-map format to be displayed on the display unit 21. The mode register 432 stores operation modes of the compact size electronic calculator 11. In the present embodiment, there are prepared various modes such as a mode selecting mode for selecting an operation mode, a computing mode (COMP mode), in which general calculations including function calculations are performed, a base mode (BASE mode), in which calculations in the hexadecimal number system and logical operations are performed, a matrix mode (MAT mode), in which matrix calculation are executed, a graph mode (GRAPH mode), in which a graph of a function expression is drawn, and a table mode (TABLE mode), in which a table calculation is executed. When a mode is set, then a mode flag corresponding to the set mode is registered in the mode register 432.

The communication flag register 433 serves to store a flag F for setting whether a communication is effected or not. When the compact size electronic calculator 11 is used independently from the display device 13, the flag F is reset, and when the compact size electronic calculator 11 and display device 13 are used in combination, the flag F is set. In the APO setting time register 434 is set a time at which the power is automatically turned off. The APO timer 435 counts a time lapse which lapses after the last operation of the input key.

The flag memory unit 436 stores graph data therein. The register for each of the modes stores data used in the respective operation modes. The work area 438 is used for processing data.

The display driving circuit 44 displays on the display unit 21 display data stored in the display register 431 under control of the control unit 41.

The sending unit 45 comprises a sending circuit 451, a light emitting element (a light emitting diode) 453, and driving elements (transistors) 455. The sending unit sends data supplied from the control unit 41 to the display device 13. The receiving unit 46 comprises a receiving element (a photo transistor) 461 and a receiving circuit 463. The receiving unit 46 receives data sent from the communication unit 33 of the display device 13, and supplies the same to the control unit 41.

The I/O port 47 exchanges data in parallel with the display device 13 through the detachable cable 15. In the present embodiment, the I/O port 47 exchanges data only at the time the power is turned on.

Figure 4:
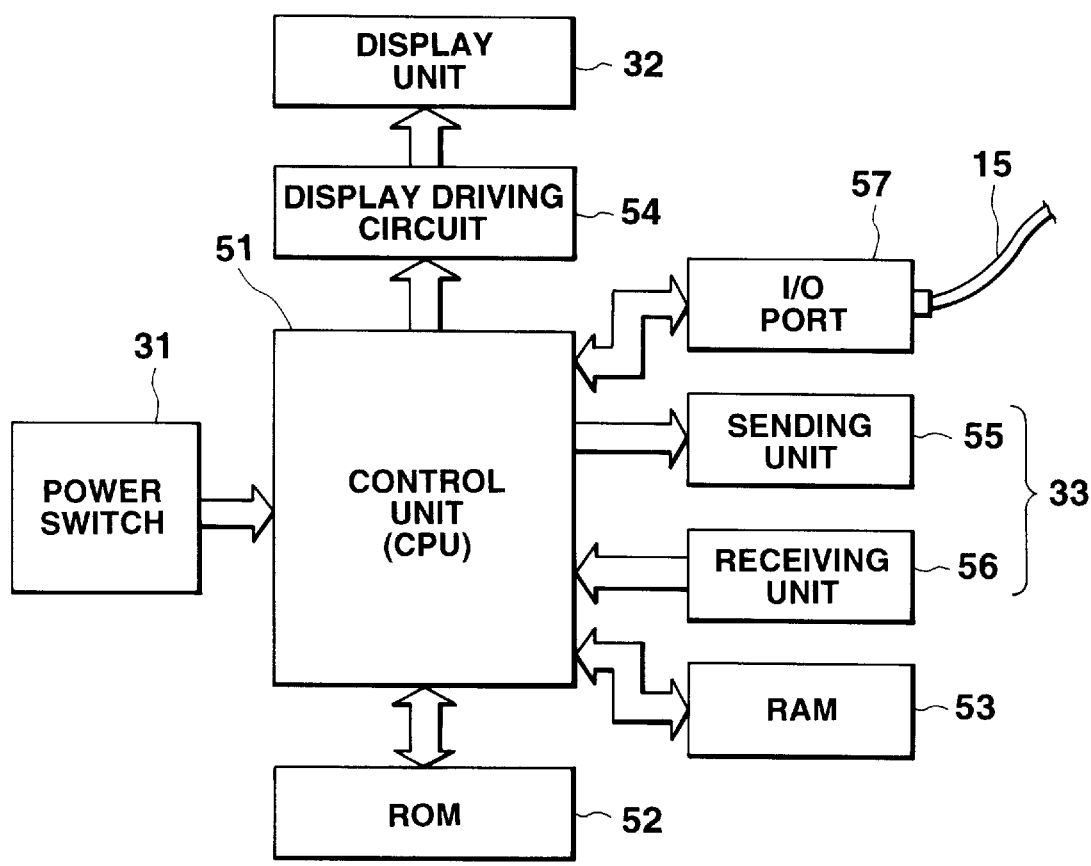
FIG. 4 is a circuit diagram of a display device of FIG. 1.

Now, a structure of the display device 13 will be described referring to FIG. 4. As shown in FIG. 4, the display device 13 comprises a control unit 51, a power switch 31 connected to the control unit 51, ROM 52, RAM 53, a display driving circuit 54, a sending unit 55, a receiving unit 56, and an I/O port 57. The display driving circuit 54 is connected with the display unit 32. The display unit 32 comprises, for example, a transparent type liquid crystal display element of 10 inch diagonal.

The control unit 51 comprises a central processing unit (CPU) and its peripheral circuits, and controls entire operation of the display device.

Figure 3:
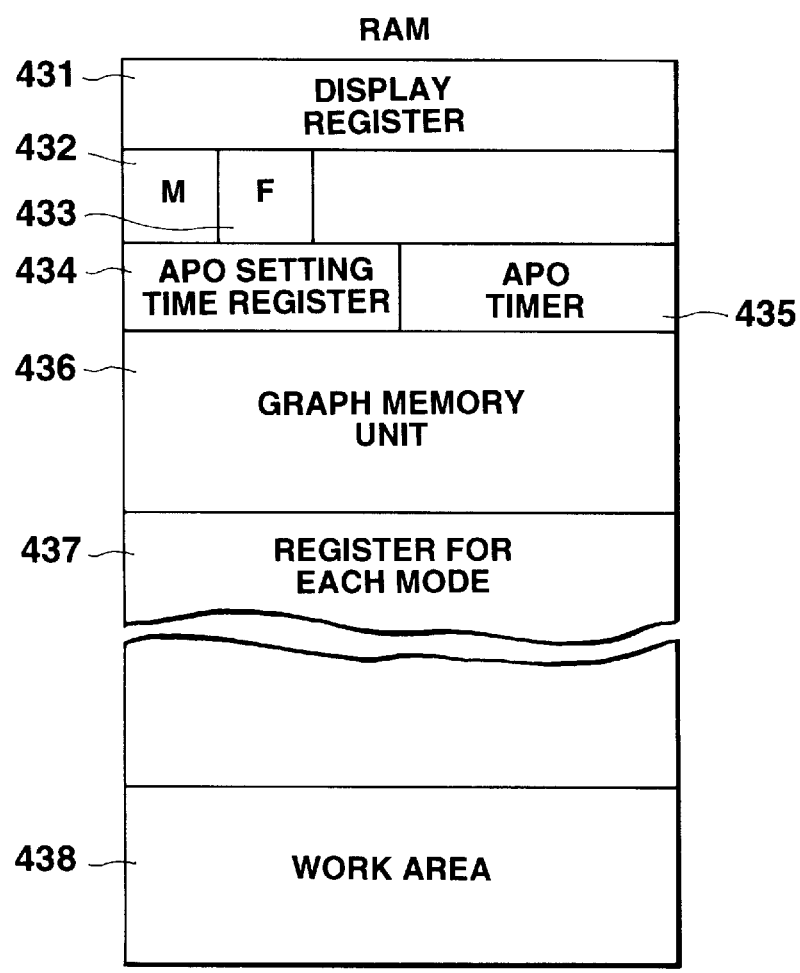
FIG. 3 is a view showing a structure of RAM shown in FIG. 2.

The ROM 52 stores therein a control program, an operation program, a display program and stationary data. The RAM 53 has a structure which is substantially similar to the RAM 43 of FIG. 3 but has not those corresponding to the communication flag register 433, the APO setting time register 434 and the APO timer 435.

The display driving circuit 54 displays on the display unit 32 data stored in the display register in the RAM 53 under control of the control unit 51.

The sending unit 55 has a structure substantially similar to the sending unit 45 of the compact size electronic calculator 11, and sends data supplied from the control unit 55 to the electronic calculator 11 using an infrared ray. The receiving unit 56 has a structure substantially similar to the receiving unit 46 of the compact size electronic calculator 11, and sends data supplied from the electronic calculator 11 to the control unit 55 using an infrared ray.

The I/O port 57 exchanges data in parallel with the compact size electronic calculator 11 through the detachable cable 15. In the present embodiment, the I/O port 57 exchanges data only at the time the power is turned on.

Figures 5, 6:
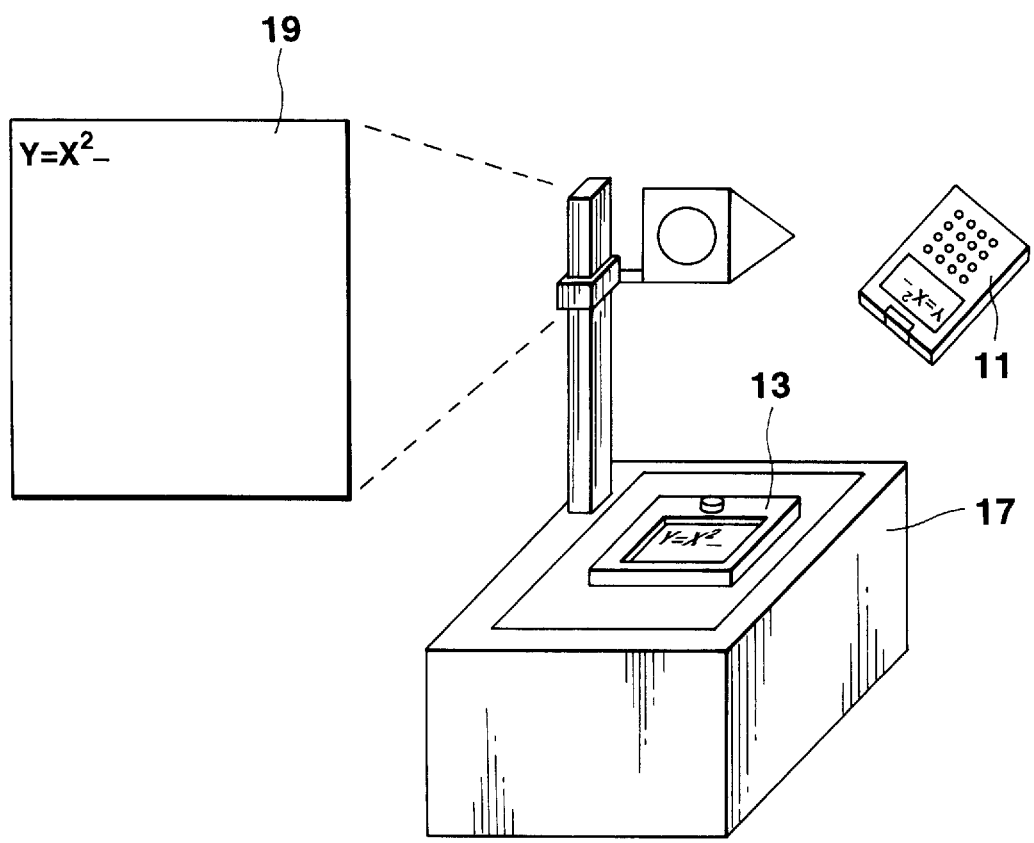
FIG. 5 is a view showing a data format of data to be transferred.
FIG. 6 is a view showing the electronic apparatus in used.

A data format for an infrared ray communication between the communication units 22 and 33 is shown in FIG. 5. Data of the data format comprises fixed data of 4 bits, device/data data of 8 bits, real data of 8 bits and check sum data of 2 bits. The data of the data format is sent in serial.

Now, operation of the electronic apparatus of the above structure will be described. FIG. 6 is a view showing the electronic apparatus in use. As shown in FIG. 6, the display device 13 is mounted on the top of an overhead projector 17, and an indication displayed on the display device 13 is enlarged and projected onto a screen 19 by the overhead projector 17.

Figure 27:
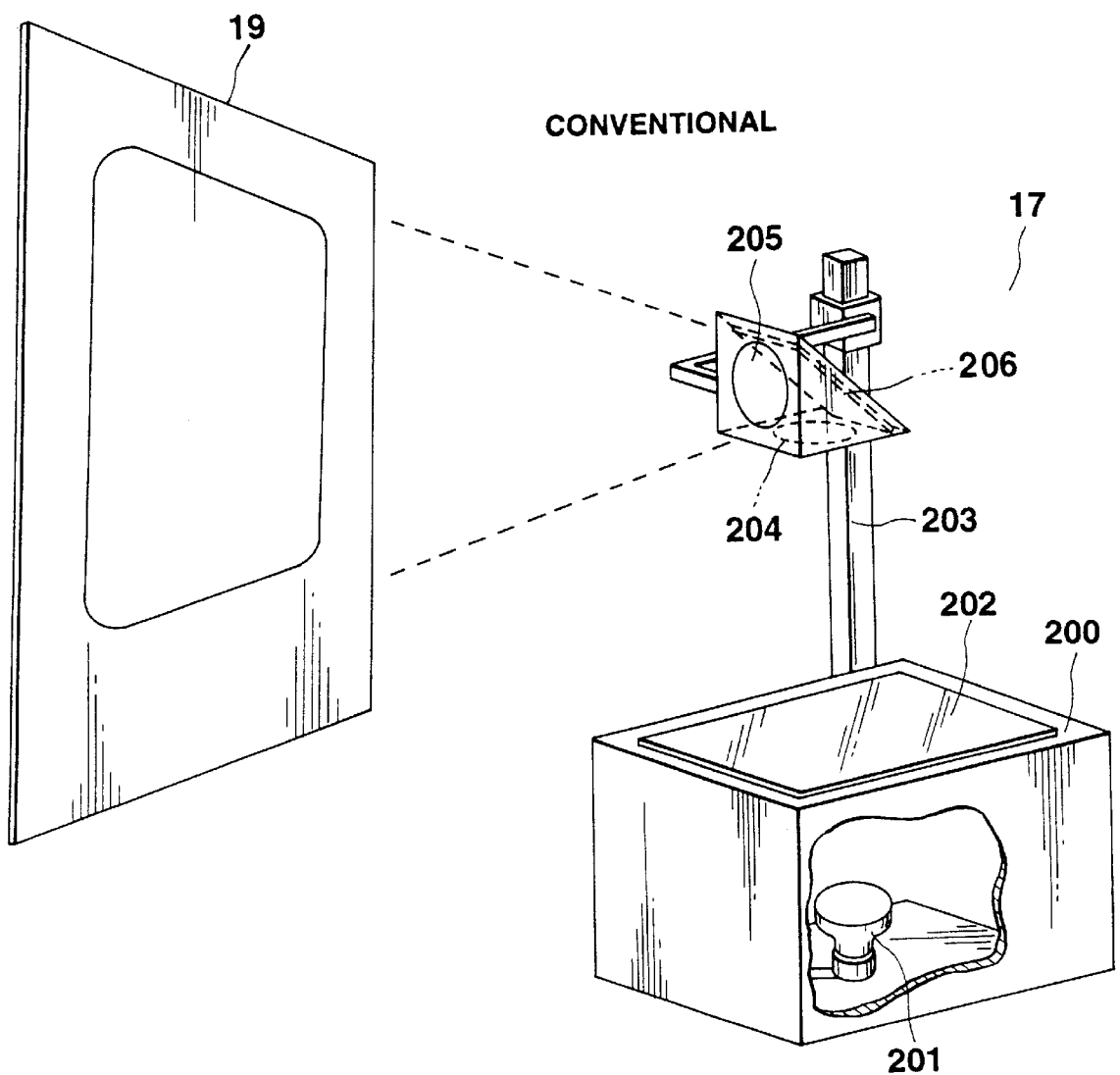
FIG. 27 is a view showing a conventional overhead projector.

Now, the overhead projector 17 will be described referring to FIG. 27. In the present embodiment, a conventional overhead projector is used. The overhead projector 17 comprises a housing 200, a lamp 201 mounted in the housing 200, a fresnel lens 202 provided on the top of the housing 200, an arm 203 fixed to the side wall of the housing 200, a lens housing supported by the arm 203, and lenses 204, 205 and a mirror 206, which are supported in the lens housing. A manuscript paper or the present electronic apparatus is placed on the fresnel lens 202 to be enlarged and projected onto the screen 19. Light of the lamp 201 guided to the fresnel lens 202 is transmitted through the same to the lens housing. The lens 204 guides the light to the mirror 206, which reflects the light in a right angles direction towards the lens 205. The lens 205 enlarges reflects the light onto the screen 19. In this way, an image of the manuscript paper or the present electronic apparatus place on the fresnel lens 202 is enlarged and projected onto the screen 19 through the lens 204, the mirror 206 and the lens 205.

A user of the electronic calculator 11 operates the key input unit 23 to display on the display unit 21 thereof his (her) desired numbers, characters, a mathematic function, results of calculations, a graph, a table and so on. The compact size electronic calculator 11 transmits input data (data not yet processed, such as numerical data and function data) through the communication unit 22 thereof to the communication unit 33 of the display device 13. The display device 13 processes the received data in a manner similar to as in the electronic calculator 11, and displays on the display unit 32 an image similar to that displayed on the display unit 21 of the electronic calculator 11.

It is a matter of course that the electronic calculator 11 can be solely used independently of the display device 13. A communication on/off key F3 in the function keys 25 controls a communication function of the electronic calculator 11. When the electronic calculator 11 is used together with the display device 13, the communication function is brought on and a flag F is set in the communication flag register 433 in the RAM 43. When the electronic calculator 11 is solely used independently of the display device 13, the communication function is brought on and the flag F is reset in the communication flag register 433 in the RAM 43.

The electronic calculator 11 has an automatic power off function which automatically turns off the power when a predetermined time has lapsed before any key is operated.

Now, operation of the electronic apparatus with the above described structure will be described referring to FIGS. 7–11.

Figure 7:
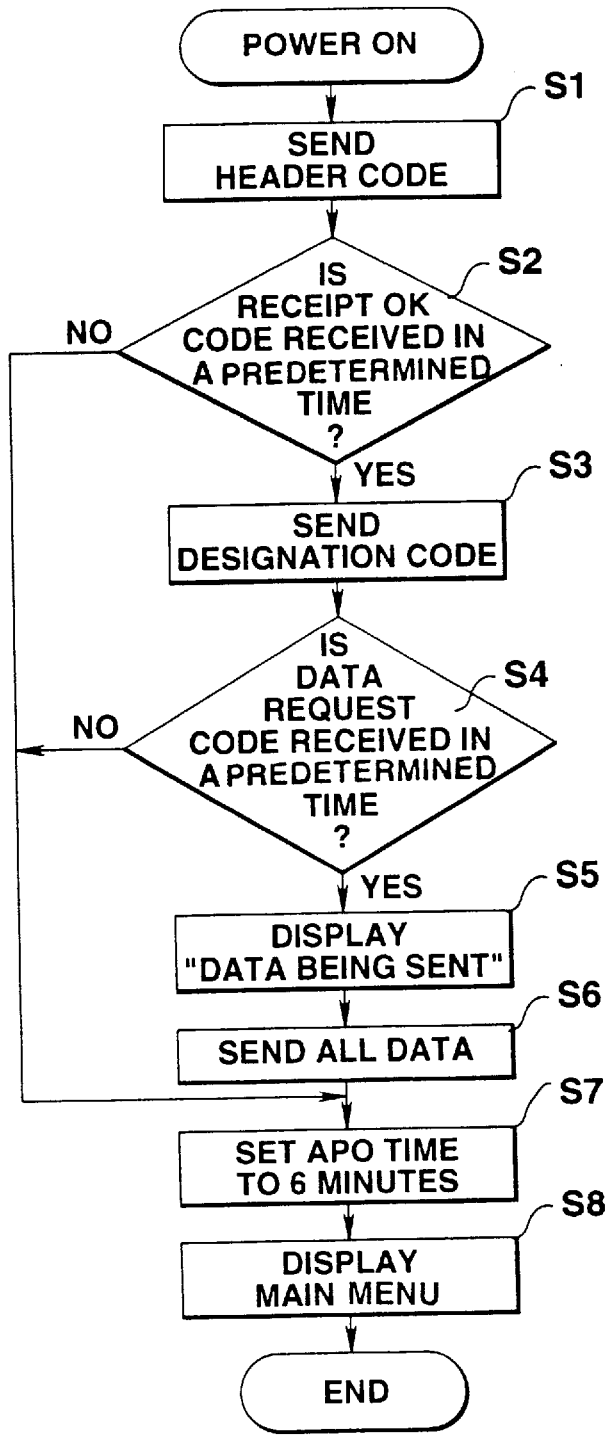
FIG. 7 is a flowchart of operation of a compact size electronic calculator of FIG. 1.
Figure 8:
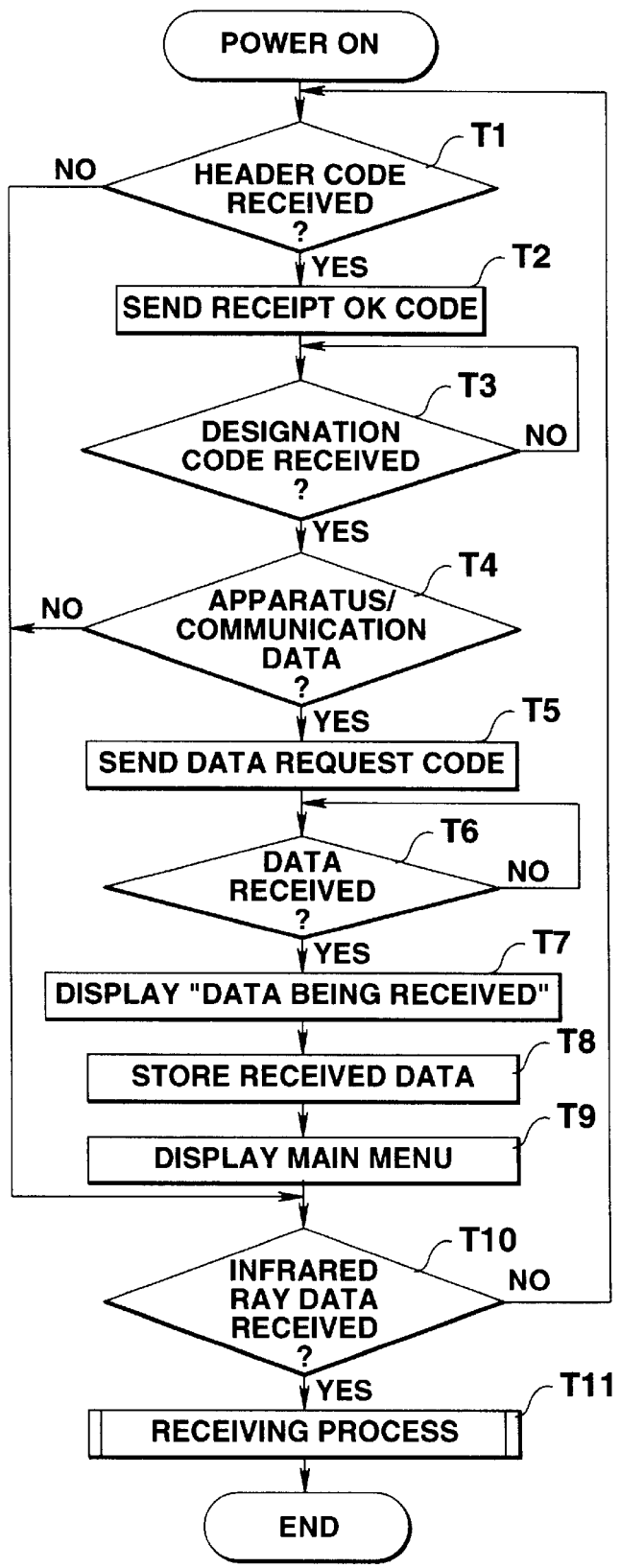
FIG. 8 is a flowchart of operation of the display device.
Figure 9:
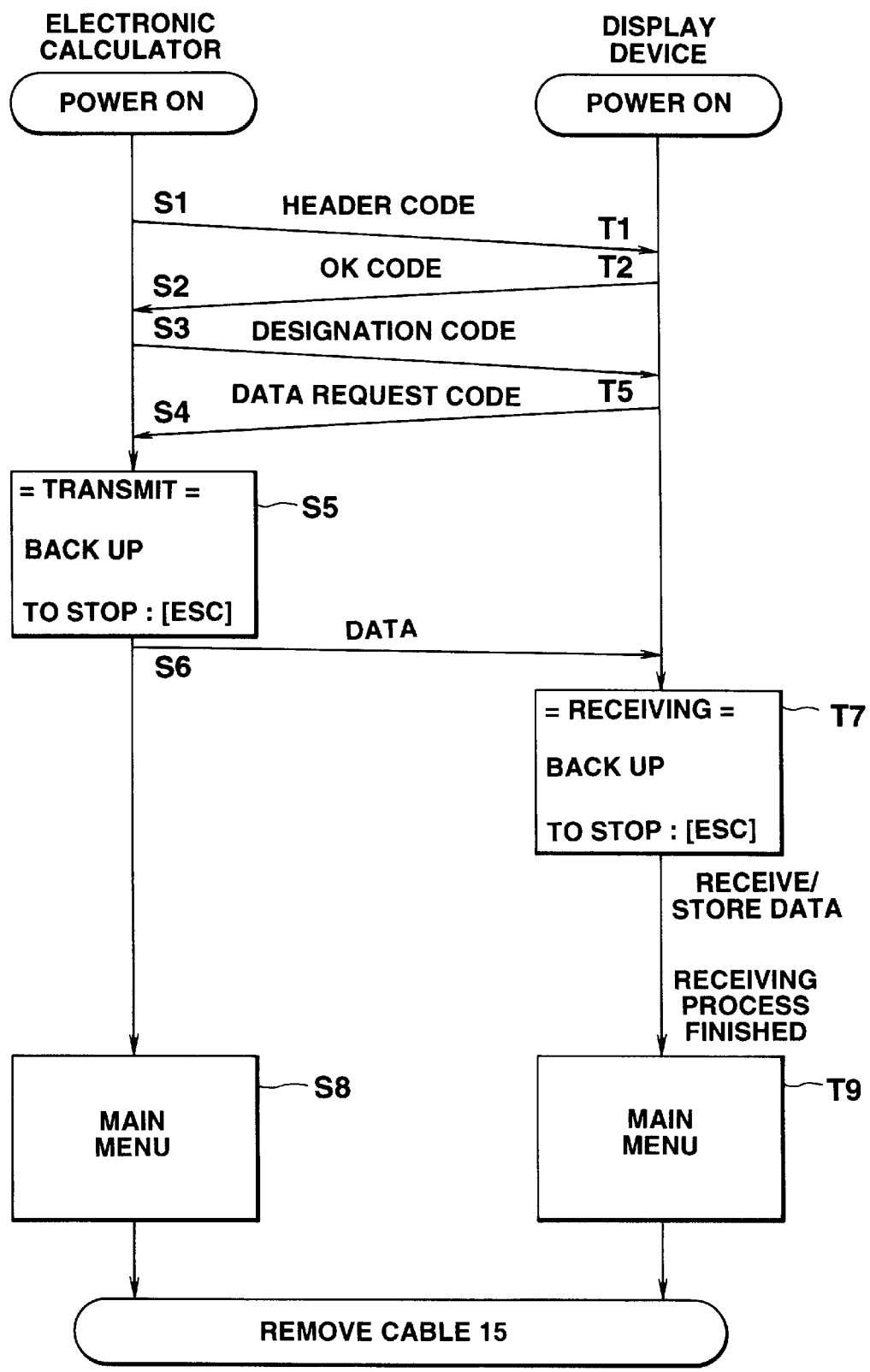
FIG. 9 is a timing chart showing timings of operations in power-on processes in the compact size electronic calculator and the display device.

Operation of the electronic calculator to be executed when the power is turned on will be described referring to FIGS. 7–9. FIG. 7 is a flowchart of operation of the electronic calculator 11 to be executed when the power is turned on. FIG. 8 is a flowchart of operation of the display device 13. FIG. 9 is a timing chart showing timings of operations of the electronic calculator 11 and the display device 13.

The user of the electronic apparatus connects the electronic calculator 11 to the display device 13 with the cable 15 before turning on the power. The RAM 43 of the display device 13 is not backed up so that contents of the RAM 43 have been lost when the power is turned on. The electronic calculator 11 sends back-up data to the display device 13 through the cable 15 when the power is turned on.

When the power switch 31 of the electronic calculator 11 is turned on, the control unit 41 sends a header code to the display device 13 through the I/O port 47 and the cable 15 at step S1 of FIG. 7 to inform a start of data transmission and also to judge whether the cable 15 is connected in place. Then, the control unit 41 judges at step S2 whether the display device 13 sends back a receipt OK code to the I/O port within a predetermined time period. Upon receipt of the receipt Ok code within the predetermined time period, the electronic calculator 11 sends the display device 13 a designation code for representing an apparatus and communication data at step S3. Then, the operation goes to step S4, where it is judged whether a data request code is received from the display device 13 within a predetermined time period. Receiving the data request code from the display device 13 within the predetermined period, the electronic calculator 11 displays an indication representing "Data being sent" on the display unit 21 at step S5, and then sends back-up data stored in the RAM 43 to the display device 13 at step S6. The back-up data are such as data input and set by the user, set up data, a created program and data in a table.

When all the back up data have been sent to the display device or when the receipt OK code or the data request code is not detected at step S2 or S4, an automatic power off time (APO) is set 6 minutes at step S7 and a main menu is displayed for selecting an operation mode at step S8 as shown in FIG. 1.

Meanwhile, when the power switch 31 of the display device 13 is turned on, the control unit 51 judges at step T1 of FIG. 8 whether a header code is received from the electronic calculator 11 through the I/O port 57 and the cable 15 within the predetermined time period. When the header code is received, the control unit 51 sends back a receipt OK code through the cable 15 to the electronic calculator 11 at step T2, and waits for a designation code at step T3. Upon receipt of the designation code, the control unit 51 judges at step T4 whether an apparatus and communication data represented by the designation code coincide with the display device 13 itself or are compatible with the display device 13. When YES at step T4, the display device 13 sends a data request code to the electronic calculator 11 at step T5.

Further, the control unit 51 waits for data from the electronic calculator 11. Upon receipt of data from the electronic calculator 11, the control unit 51 displays an indication of "Data being received" on the display unit 32 at step T7, and stores the received data in an appropriate area in the RAM 53 at step T8. When the header code is not received at step T1, or when the apparatus and communication data represented by the designation code does not coincide or are not compatible with the display device 13 at step T4, or when a storing process has been finished ta step T8, a main menu is displayed at step T9 as shown in FIG. 1.

When the main menus are displayed respectively on the compact size electronic calculator 11 and the display device 13, the cable 15 is removed therefrom.

Then the control unit 51 of the display device 13 brings the receiving unit 56 in an infrared ray data receiving state, and judges at step T10 whether the receiving unit 56 has received an infrared ray data. When no infrared ray data has been received, the control unit 51 returns to step T1, where the receiving unit 56 is brought to the infrared ray data receiving state. When the infrared ray data has been received at step T10, the operation advances to step T11, where a receiving process is executed as will be described later.

In the above, the processes to be executed respectively in the electronic calculator 11 and the display device 13 when the power is turned on have been described. The timings of operations in these processes are shown in FIG. 9.

Now, a key process to be executed by the compact size electronic calculator 11 in a normal operation mode will be described with reference to a flowchart of FIG. 10.

Figure 10:
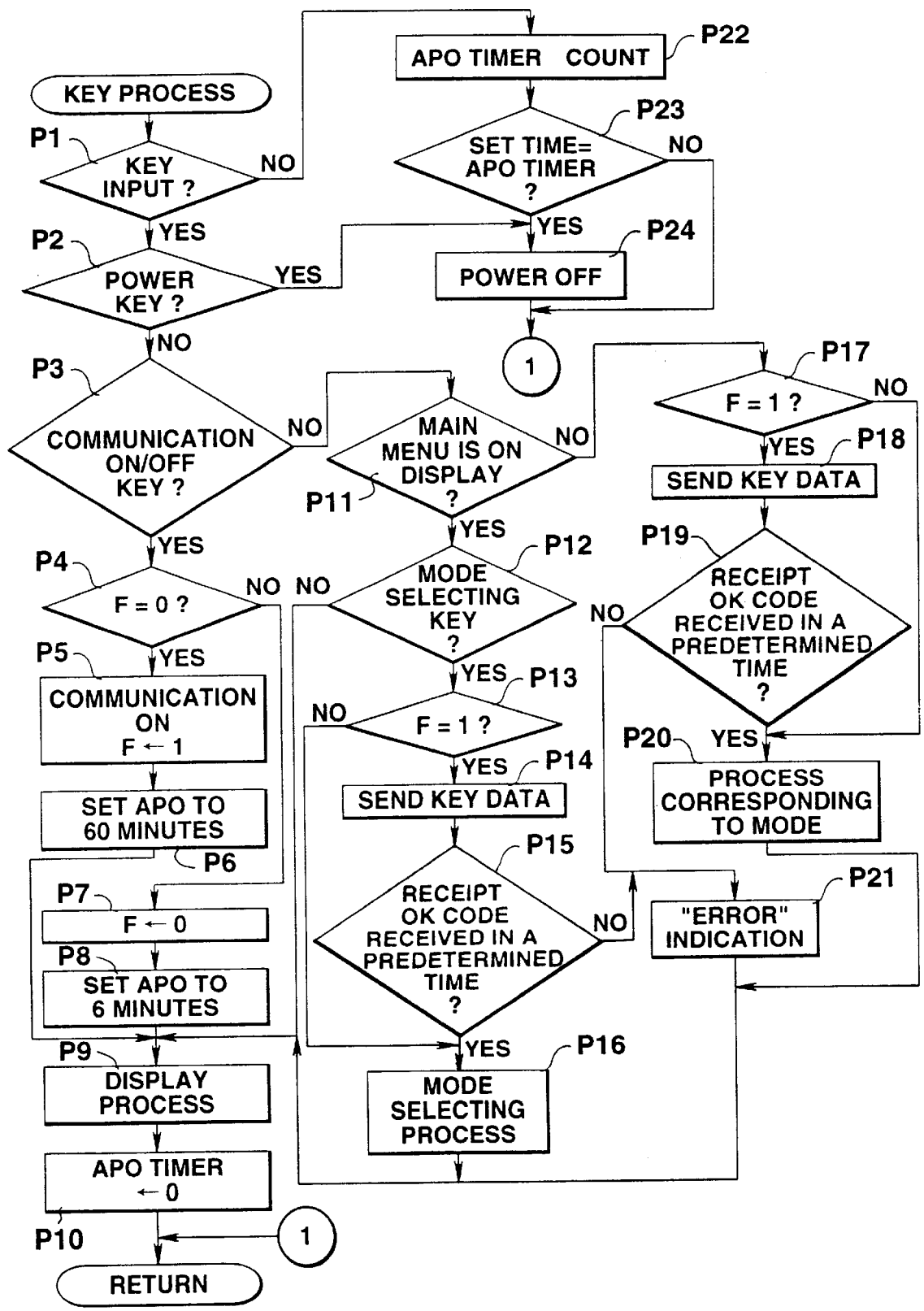
FIG. 10 is a flowchart of a key process in the compact size electronic calculator.

The control unit 41 of the electronic calculator 11 executes the key process of FIG. 10 at timer interruptions of 100 micro seconds. At step P1 of FIG. 10, it is judged whether a key operation has been executed. When the key operation is not executed (when NO), a value of the APO timer 435, which represents a time lapse from the last key operation, is renewed at step P22. Then, it is judged at step P23 whether the value of the APO timer 435 has reached the time set in the APO setting time register 434. When the value of the APO timer 435 has reached the time set in the APO setting time register 434 (when YES), the power is turned off at step P24, and the operation returns to the main routine process. When NO, the operation directly returns to the main routine process.

When it is determined at step P1 that a key operation has been executed, the operation advances to step P2, where it is judged whether the power key 30 is operated. When it is determined that the power key 30 is operated (when YES), the operation goes to step P24, where a power off process is executed. In the power off process is included a process for setting a flag in the communication flag register 433.

When it is determined at step P2 that the power key 30 is not operated (When NO), the operation advances to step P3, where it is judged whether the communication on/off key F3 has been operated. When YES, it is judged at step P4 whether the flag of the communication flag register 433 has been set to "0", i.e., whether F=0 is true. In case of F=0, the flag F of the communication flag register 433 is set to "1", and the compact size electronic calculator 11 is brought to a state in which same be used together with the display device 13 at step P5. In general, the user often uses the electronic calculator 11 in this state, when he (she) gives some lecture or explanation. In such lecture or explanation, usually a time interval between key operations gets longer. Therefore, a time interval set in the APO setting time register 434 is set to 60 minutes at step P6. Then, a display process is executed at step P9, and a value "0" is set to the APO timer 435 at step P10. Thereafter, the operation returns to the main routine process.

Meanwhile, when it is determined at step P4 that F=1 is true, the flag F of the communication flag register 433 is set to "0" at step P7, and "6 minutes" is set to the APO setting time register 434 at step P8. Then, similarly the display process is executed at step P9, and a value "0" is set to the APO timer 435 at step P10, and then the operation returns to the main routine process.

When it is determined at step P3 that the communication on/off key F3 has not been operated, the operation goes to step P11, where it is judged from the value of the mode register 432 whether the main menu (operation mode selecting display or indication) is on display as shown in FIG. 1.

When the main menu is on display, it is judged at step P12 whether a mode selecting key has been operated. The mode selecting key is the cursor key 24, numeral key 26, or the execution key 29.

When the mode selecting key has not been operated, the operation advances to step P9, where the display process is executed. When it is determined at step P12 that the mode selecting key has been operated, it is judged at step P13 whether F=1 is true. When F=1 is true, inputted key data is sent, using the infrared ray communication, from the sending unit 45 to the display device 13 at step P14. At step P15, it is judged whether the receiving unit 46 has received a receipt OK code from the display device 13 within the predetermined time period. When YES at step P15 or when F=0 is true at step P13, a mode selecting process is executed at step P16.

When, for example, the numeral key 26 is operated, an operation mode corresponding to the operated numeral key is set in the mode register 432. When the cursor key 24 is operated, a cursor moved in the direction of the operated cursor key. When the execution key 29 is operated, an operation mode on which the cursor positions is selected and set in the mode register 432. After executing the mode selecting process, the operation advances to step P9, where a corresponding display process is executed.

When it is determined at step P11 that the main menu is not on display, i.e., when the operation mode has been set, it is judged at step P17 whether F=1 is true. When F=1 is true at step P17, key data representing the operated key is sent to the display device 13 through the sending unit 45 using the infrared ray communication at step P18. Then, it is judged at step P19 whether receiving unit 46 has received a receipt OK code from the display device 13. When YES at step P19 or when F=0 at step P17, a process corresponding to the mode is executed, and the result is displayed at step 9.

When it is determined at steps P15 and P19 that the receipt OK code has not been received within the predetermined time period, an indication representing "ERROR" is displayed for a predetermined time at step P21 and the operation goes to the display process at step P9, where the same indication as that displayed before the key data is not sent is displayed, since the process corresponding to the operated key is not executed.

Figure 11:
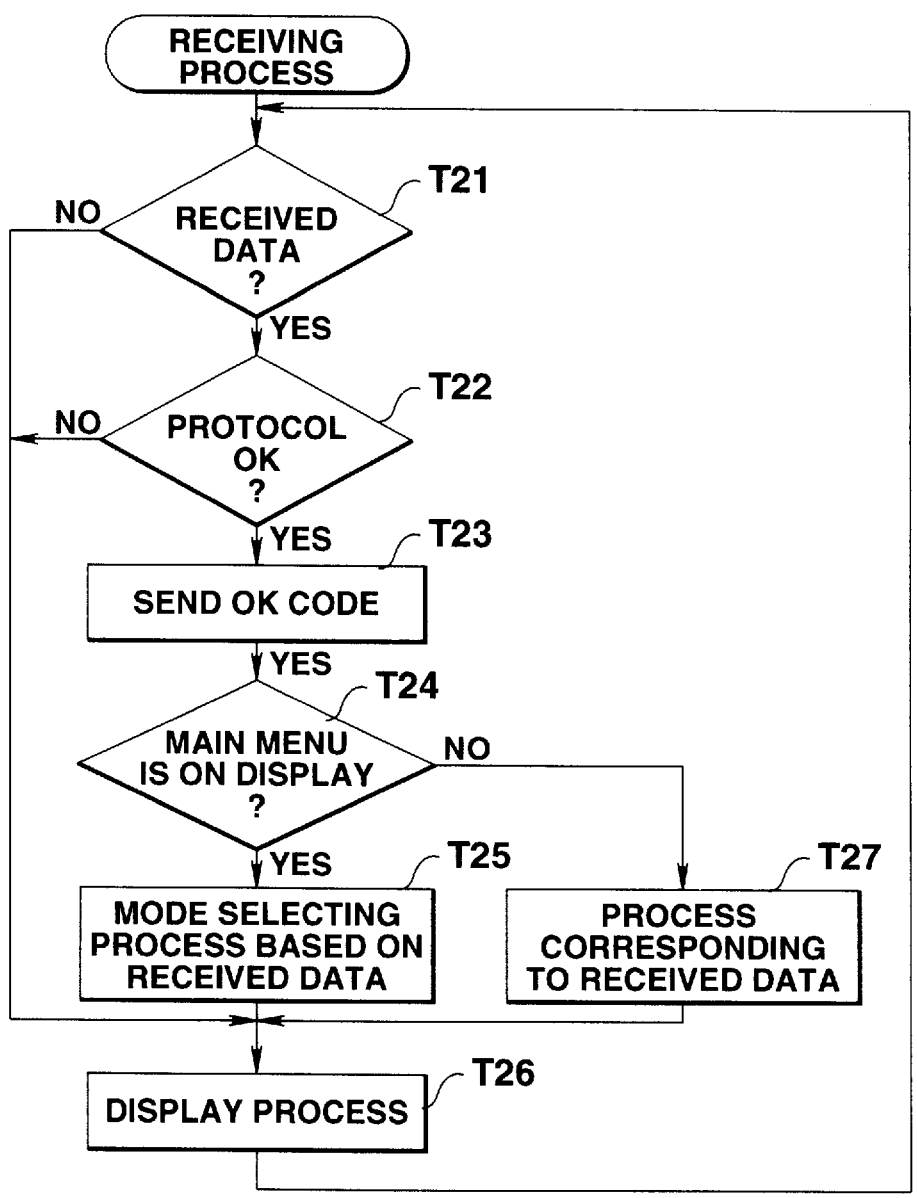
FIG. 11 is a flowchart of operation of the display device.

Now, the receiving process to be executed by the display device 13 at step T11 of FIG. 8 will be described referring to the flowchart of FIG. 11.

The control unit 51 judges at step T21 whether any data is received. When data is received, the control unit 51 judges the protocol of the received data at step T22 to determine whether the protocol of the received data coincides with the its own communication protocol. When both the protocols coincide with each other, the display device 13 sends an OK code through the sending unit 55 to the compact size electronic calculator 11 at step T23.

At step T24, it is judged whether the main menu is on display. When the main menu is on display, the mode selecting process is executed based on the received data at step T25 in a manner similar to that at step P16. The display process corresponding to the main menu for selecting a mode or the display process corresponding to the selected mode is executed at step T26. Thereafter, the operation returns to step T21.

Meanwhile, when it is determined at step T24 that the main menu is not on display, a process corresponding to the mode based on the received data as the key code is executed by the electronic calculator 11 at step T27. Thereafter, the display process corresponding to the process is executed at step T26, and then the operation returns to the step T21.

The above operation will be described more specifically. Now, we assume that the cursor positions on a normal calculation mode with the main menu displayed, i.e., with the selecting mode being set in the mode register 432 as shown in FIG. 1. When a right pointing cursor is operated, the operation advances through steps P1, P3 and P11 to step P12, where it is determined YES. The operation further advances to step P16, where the cursor moves to the base mode. When F=1, key data is sent to the display device 13, and, in the display device 13, the cursor moves at step T25 and the corresponding indication is displayed at step T26.

When the execution key 29 is operated in this state, the mode selecting process is executed at step P16 to set the base mode in the mode register 432. When F=1, the display device 13 is also set to the base mode.

When a numeral "5" is entered with the main menu displayed, the operation advances through steps P1, P3, P11 and P12 to step P16, where a matrix calculation mode is set.

Figure 12:
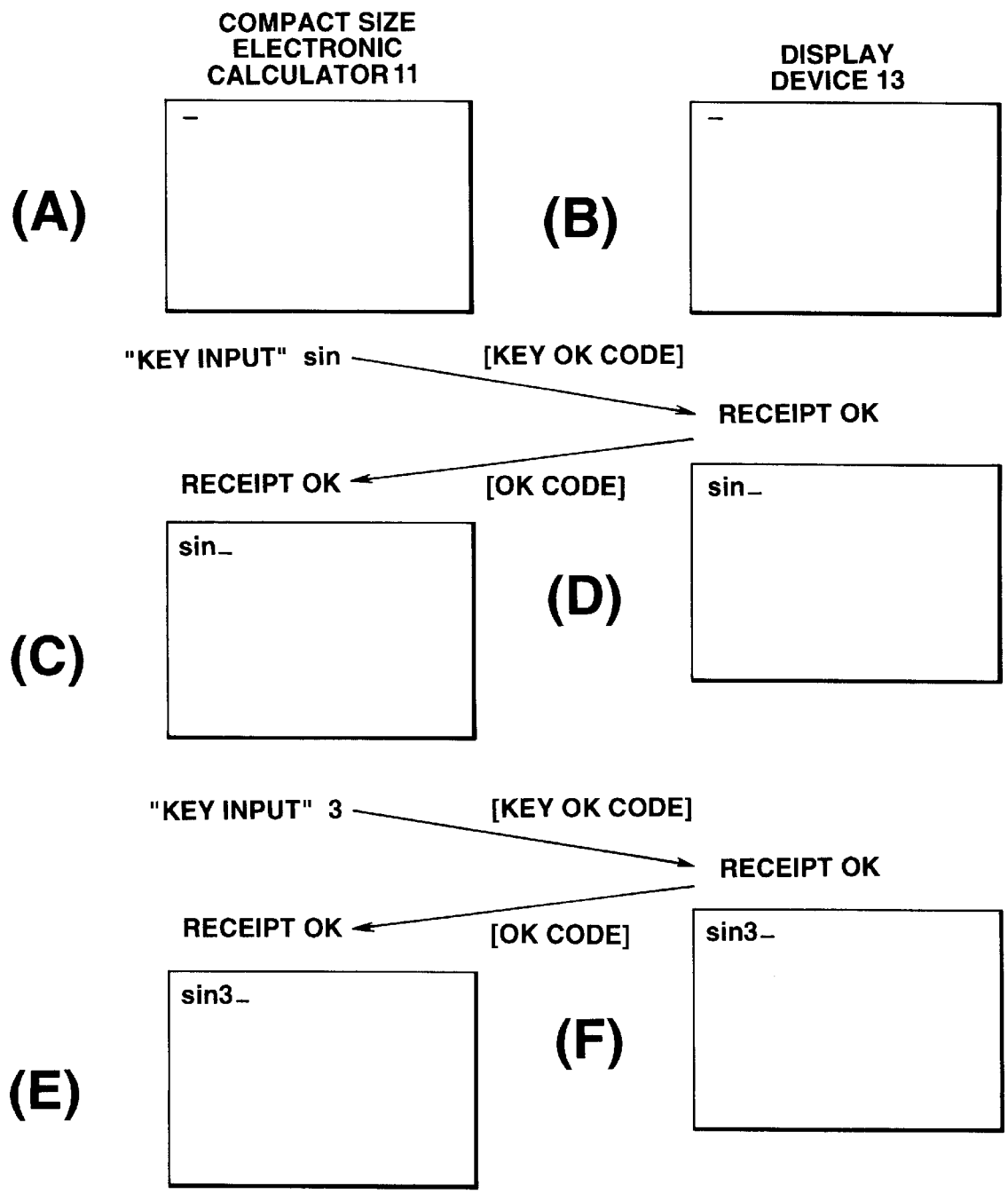
FIGS. 12–14 are views showing data flow between the compact size electronic calculator and the display device to calculate "sin 30" and transitive indications displayed on the compact size electronic calculator and the display device.

Now, we assume that a calculation mode is set to the mode register 432 and data has not yet been entered. Indications to be displayed respectively on the compact size electronic calculator 11 and the display device 11 at this state are shown at (A) and (B) in FIG. 12.

When a "sin" key among the function keys 28 is operated with the above state, the operation advances through steps P1, P2, P3, P11 and P17 to step P18, where a key code corresponding to the operated "sin" key is sent to the display device 13. When the display device 13 receives the key code, it is determined at step T21 that the key code has been received, and the operation advances to step T23, where the display device 13 sends back an OK code to the electronic calculator 11. Further, a function "sin" is written in the work area of the RAM 53 at step T27. A symbol of "sin" is converted into an dot pattern in the display register 431, and, then, an indication of "sin" is displayed on the display unit 32 at step T26 as shown at (D) in FIG. 12.

Meanwhile, the OK code sent by the display device 13 is detected at step P19, the function "sin" is written in the work area 438 of the RAM 43 at step P20. Further, a symbol of "sin" is also converted into a dot pattern in the display register 431, and, then, an indication of "sin" is displayed on the display unit 32 at step P9 as shown at (C) in FIG. 12. As described above, the compact size electronic calculator 11 and the display device 13 display the same indications thereon.

Further, we assume that an angle "30" is entered. The user operates the numeral key 26 to enter "3". The key input is detected at step P1, and a key code of the key input "3" is sent to the display device 13 at step P18. Receiving the key code, the display device 13 sends back an OK code to the electronic calculator 11 at step T23. The electronic calculator 11 and the display device 13 executes processes corresponding the modes respectively at steps P20 and T 26. Accordingly, the electronic calculator 11 and the display device 13 display "sin 3" on the display units 21 and 32 respectively, as shown at (E) and (F) of FIG. 12.

Figure 13:
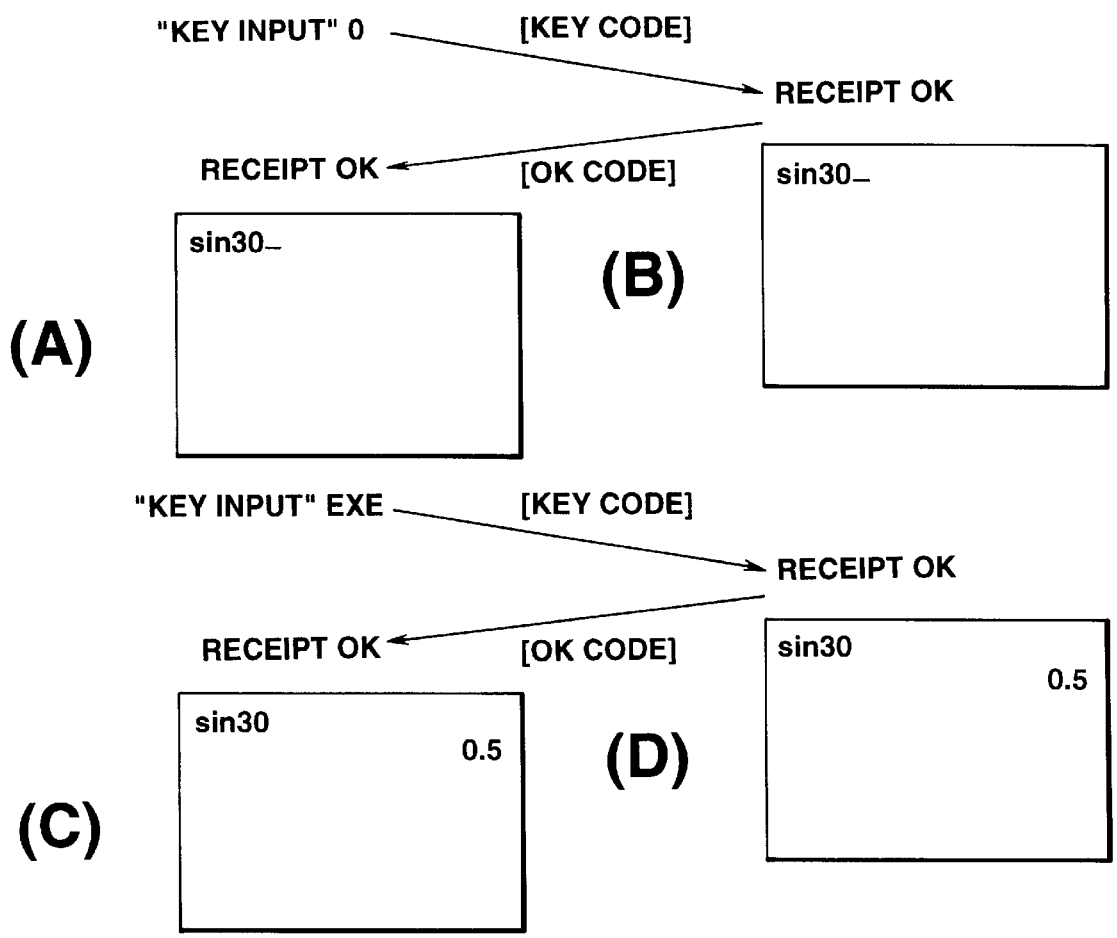

Further, the user enters "0". Then, the similar processes are executed in the electronic calculator 11 and the display device 13. Accordingly, the electronic calculator 11 and the display device 13 display "sin 30" on the display units 21 and 32 respectively, as shown at (A) and (B) of FIG. 13.

The user further operates the execution key 29 to obtain a value of "sin 30". A key code of the execution key 29 is sent to the display device 13 at step P18. Receiving the key code, the display device 13 sends back the OK code to the electronic calculator 11 at step T23. Then, a "sin 30" is operated at step T27, and the obtained result, 0.5, is displayed at step T26 as shown at (D) of FIG. 13. Responding to the OK code from the display device 13, the electronic calculator 11 performs a similar operation at step 20, and the resultant 0.5 is displayed at step P9 as shown at (C) in FIG. 13.

Figure 14:
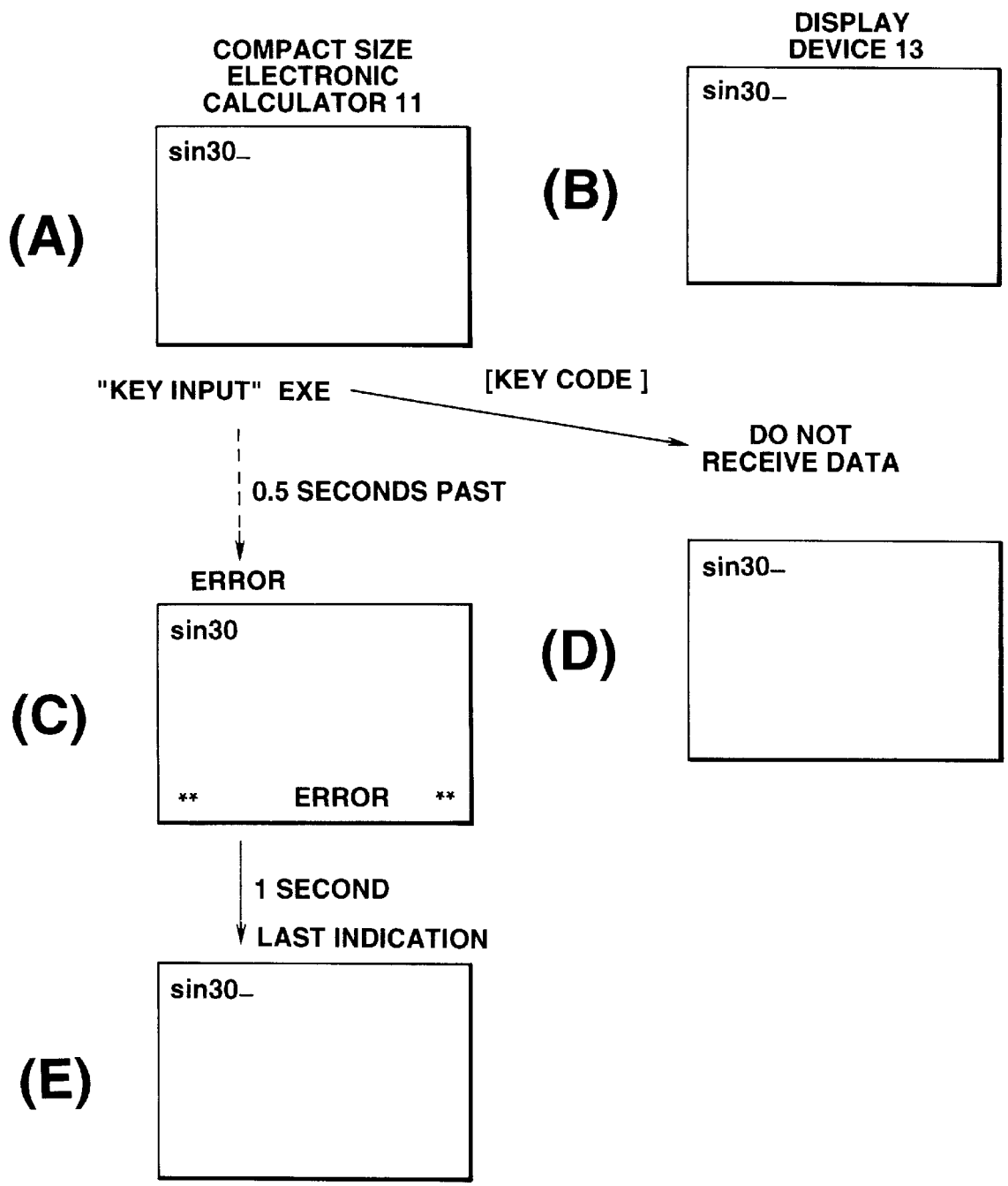

Further, we assume that, even though the user operates the execution key 29 with "sin 30" displayed on the electronic calculator 11 and the display device 13 to obtain a value of the "sin 30", the display device 13 does not receive the key code of the execution key 29. In this case, there is no change in the indication displayed on the display device 13 as shown at (B) and (D) in FIG. 14. Further, the display device 13 does not send the OK code to the electronic calculator 11. Accordingly, it is determined NO at step P19, and the indication of "ERROR" is displayed at the bottom of a display screen for one second at step P21, and the last indication is displayed again at step P9 as shown at (E) in FIG. 14.

In the present embodiment of the electronic apparatus described above, the compact size electronic calculator 11 is used as a remote control device for controlling the display device 13 to display data thereon to be projected onto the screen. Further, in the electronic apparatus, the compact size electronic calculator 11 does not send processed data such as display data but inputted key data to the display device 13, and the display device 13 processes the received key data in a similar manner as in the electronic calculator 11. Therefore, data can be transmitted rapidly from the electronic calculator 11 to the display device 13, and an electronic apparatus of a quick response is available. Since the electronic calculator 11 is arranged not to execute any process when the display device 13 can not receive data, both the electronic calculator 11 and the display device 13 do not execute different process independently from each other. With the present electronic apparatus, a noise- free short-time data transmittance is realized with a high rate of success of data exchange.

Figure 15:
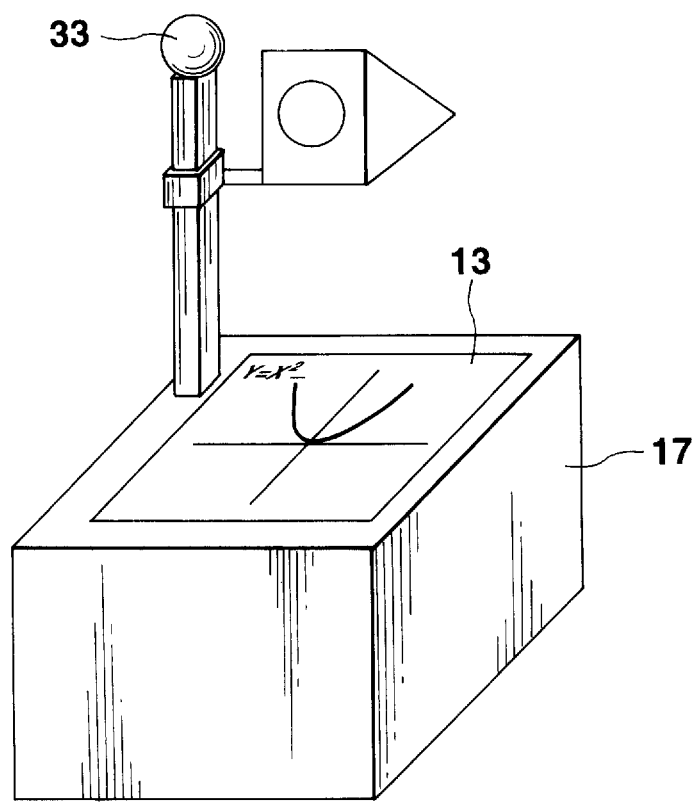
FIG. 15 is a view showing a conventional overhead projector which incorporates the display device.

In the above embodiment, the display device 13 which is placed on the top of the overhead projector 17 has been described, but the display device may be arranged to be mounted in the overhead projector as shown in FIG. 15. The present invention is not limited to those to be used with the overhead projector, but may be used with other apparatus.

In the embodiment, a key board is used for inputting data, and data to be processed therein are key data, but any data will be used. In other words, data are inputted to the compact size electronic calculator by using a pointing device such as a mouse, a thumb ball, an electromagnetic pen and an optical pen, these data may be used. The electronic calculator is provided with a tablet for inputting coordinates, data inputted through the tablet may be also used.

Further, in the above embodiment, the infrared ray communication has been described, but a communication using light, super sonic wave, an electromagnetic wave may be used. Data are transmitted effectively in series but may be sent in parallel.

SECOND EMBODIMENT

Now, a second embodiment of the electronic apparatus according to the present invention will be described.

Figure 16:
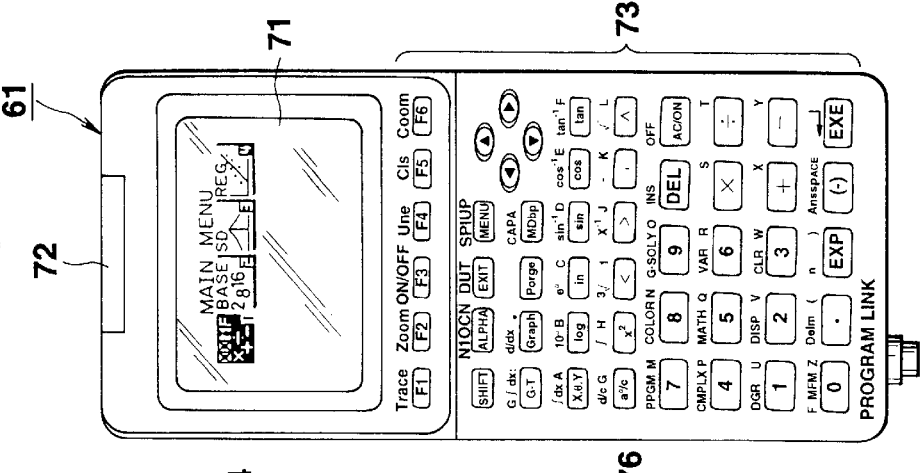
FIG. 16 is an external view of a second embodiment of the electronic apparatus of the invention, including a compact size electronic calculator 61 shown at (A), a compact size electronic calculator 62 shown at (B), and a display device 63 shown at (C)
Figure 16:
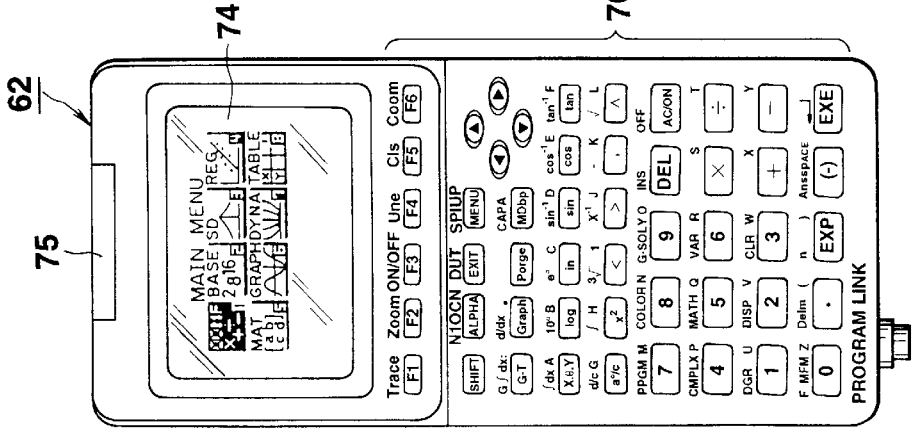
Figure 16:
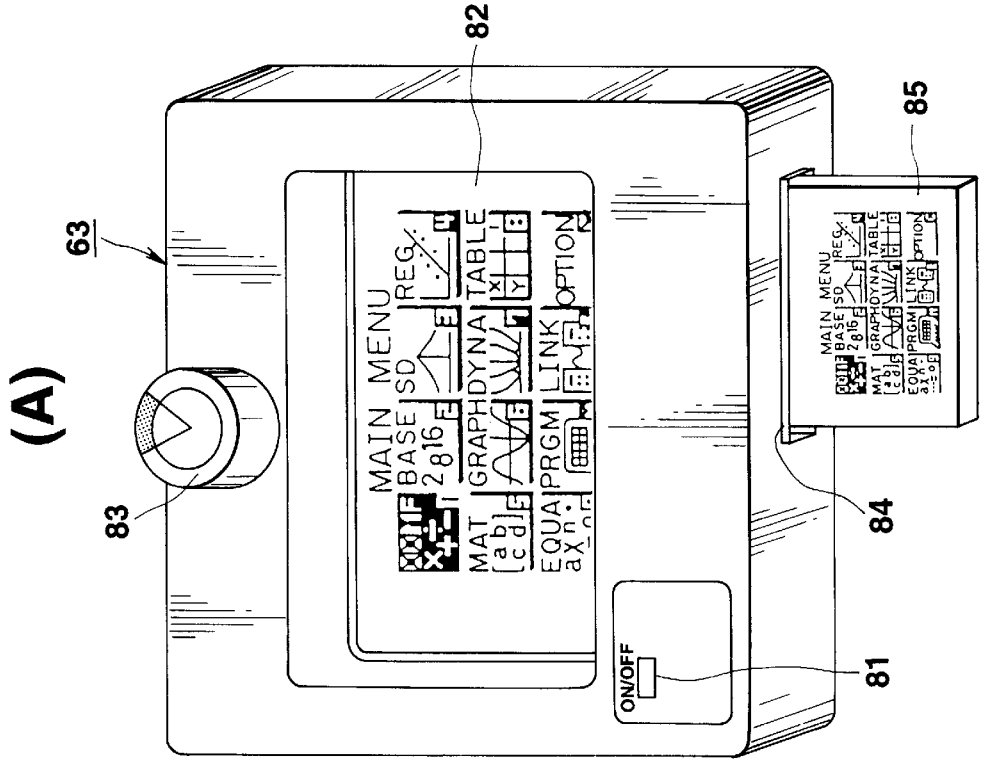

FIG. 16 is an external perspective view of the second embodiment of the electronic apparatus of the present invention. As shown in FIG. 16, the second embodiment of the electronic apparatus of the invention comprises a compact size electronic calculator 61 (a remote controller), a compact size electronic calculator 62, and a display device 63 which displays an image in accordance with an instruction given by the calculator 61 or 62.

Both the compact size electronic calculators (hereafter, sometimes electronic calculator) 61 and 62 are of a palm top size, and comprise display units 71 and 74, communication units 72 and 75, and key input units 73 and 76, respectively, as shown at (A) and (B) in FIG. 16. The display units 71 and 74 each have a liquid crystal display panel. The communication units 72 and 75 each have an infrared ray communication apparatus for exchanging data with the display device 63.

As shown on the display unit 71 at (A) of FIG. 16, the electronic calculator 61 has a COMP mode (first mode) for performing general calculations including function calculations, a BASE mode (second mode) for performing calculations in the hexadecimal number system and logical operations, an SD mode (third mode) for performing one variable statistical calculations (standard deviation calculation), and an REG mode (fourth mode) for two variable statistical calculations (regression calculation).

The compact size electronic calculator 62 is a version-up version calculator to the electronic calculator 61. In addition to the above modes, the electronic calculator 62 has a MAT mode (fifth mode) for performing matrix calculations, a GRAPH mode (sixth mode) for drawing a graph of a function expression, a DYNA mode (seventh mode) for drawing graphs of a function expression for various variables, and a TABLE mode (eighth mode) for performing table calculations, as shown on the display unit 74 at (B) of FIG. 16.

The display device 63 is provided with a power switch 81, a display unit 82 having a comparably large-size transparent type liquid crystal panel, a communication unit 83, and an IC card receiving slot 84, as shown at (C) in FIG. 16. The display device 63 supports the above first to fourth modes of the electronic calculator 61, in other word, the display device 61 supports only the functions of the electronic calculator 61. Therefore, the display device 63 with no IC card held therein displays only an indication for selecting the modes (first to fourth) ((C) in FIG. 16). Receiving therein IC card 85 including control information for the first mode to eighth mode, the display device 63 will support the fifth to eighth mode, and displays an indication for selecting a mode shown at (c) in FIG. 16.

Figure 17:
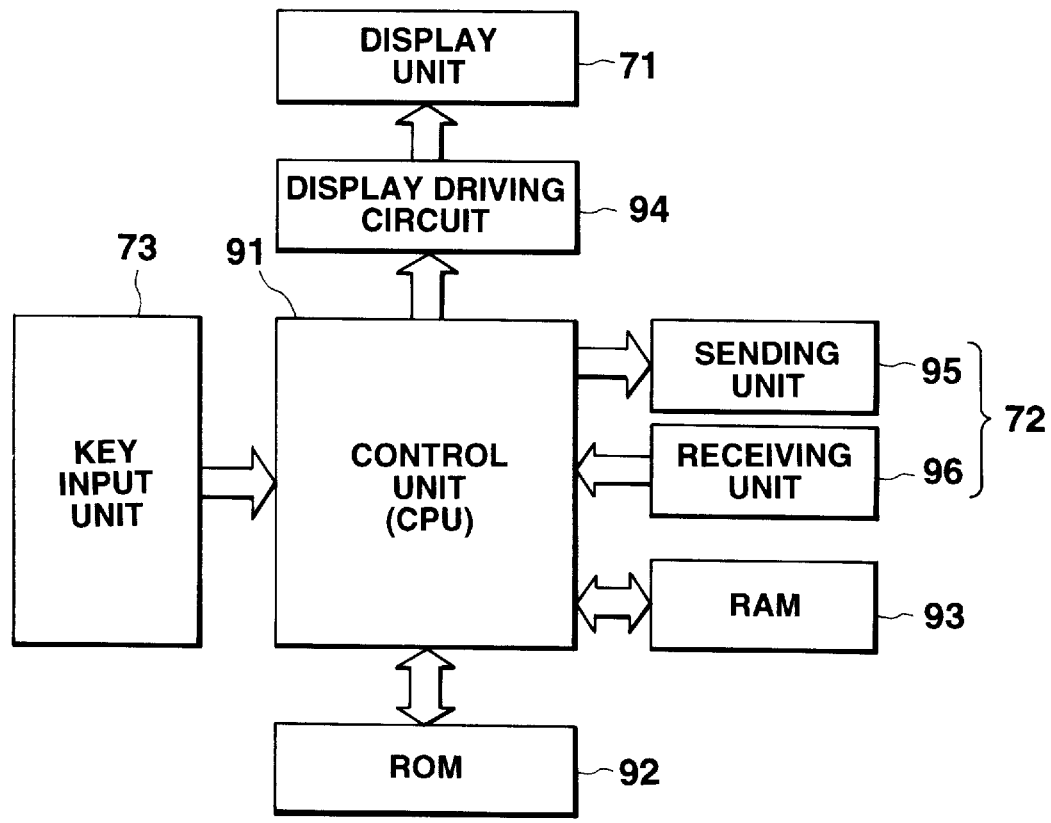
FIG. 17 is a circuit diagram of the compact size electronic calculators 61, and 62.

The compact size electronic calculator 61 is provided with a control unit 91, a key input unit 73, ROM 92, RAM 93, a display driving circuit 94, a sending unit 95 and a receiving unit 96. The key input unit 73, ROM 92, RAM 93, the display driving circuit 94, the sending unit 95 and the receiving unit 96 are connected to the control unit 91, as shown in FIG. 17.

The control unit 91 includes a central processing unit (CPU) and its peripheral circuits, and controls entire operation of the electronic calculator 61 in accordance with a program stored in the ROM 92. The ROM 92 of the electronic calculator 61 stores therein control information (a program and fixed data) for performing the first to fourth mode.

The electronic calculator 62 has the same structure as the electronic calculator 61. The ROM 92 of the electronic calculator 62 stores therein control information (a program and fixed data) for performing the first to eighth mode.

Figure 18:
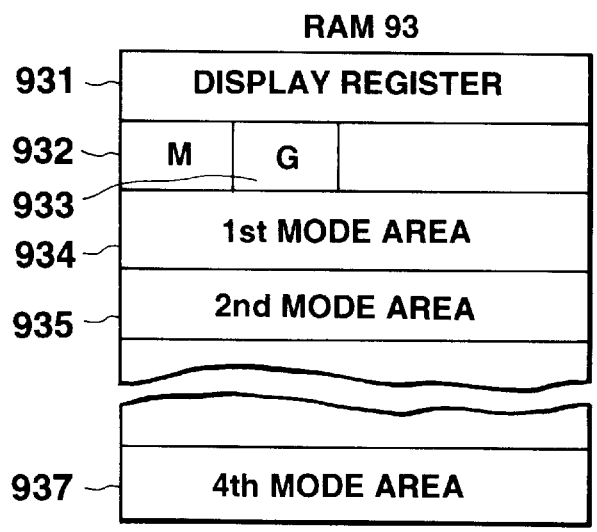
FIG. 18 is a view showing a structure of RAM shown in FIG. 17.

As shown in FIG. 18, the RAM 93 of the electronic calculator 61 is provided with a display buffer 931 for storing display data, a mode register 932 for storing an operation mode, a communication flag register 933 and a first mode to a fourth mode memory area 934–937.

Similarly, the RAM of the electronic calculator 62 is provided with a display buffer for storing display data, a mode register for storing an operation mode, a communication flag register and a first mode to an eighth mode memory area (not shown).

The display buffer 931 stores an image to be displayed on the display unit 71 in a bit map format.

The communication flag register 933 serves to store a flag G for setting whether a communication is executed or not. In case that the electronic calculators 61 and 62 are used alone, the flag G is reset, and in case that the electronic calculators 61 and 62 and the display device 63 are used in combination, the flag G is set.

In the first mode to the forth mode memory area 934–937 of the electronic calculator 61 are stored data necessary for executing processes in the respective operation modes. Similarly, in the first mode to the eighth mode memory area are stored data necessary for executing processes in the respective operation modes.

The display driving circuit 94 displays display data stored in the display buffer 931 on the display unit 71 under control of the control unit 91.

The sending unit 95 sends the display device 63 data supplied from the control unit 91 using the infrared ray communication. The receiving unit 96 receives data sent from the communication unit 83 of the display device 63, and sends same to the control unit 91.

The respective units of the electronic calculator 62 execute processes in a similar manner as described above.

Figure 19:
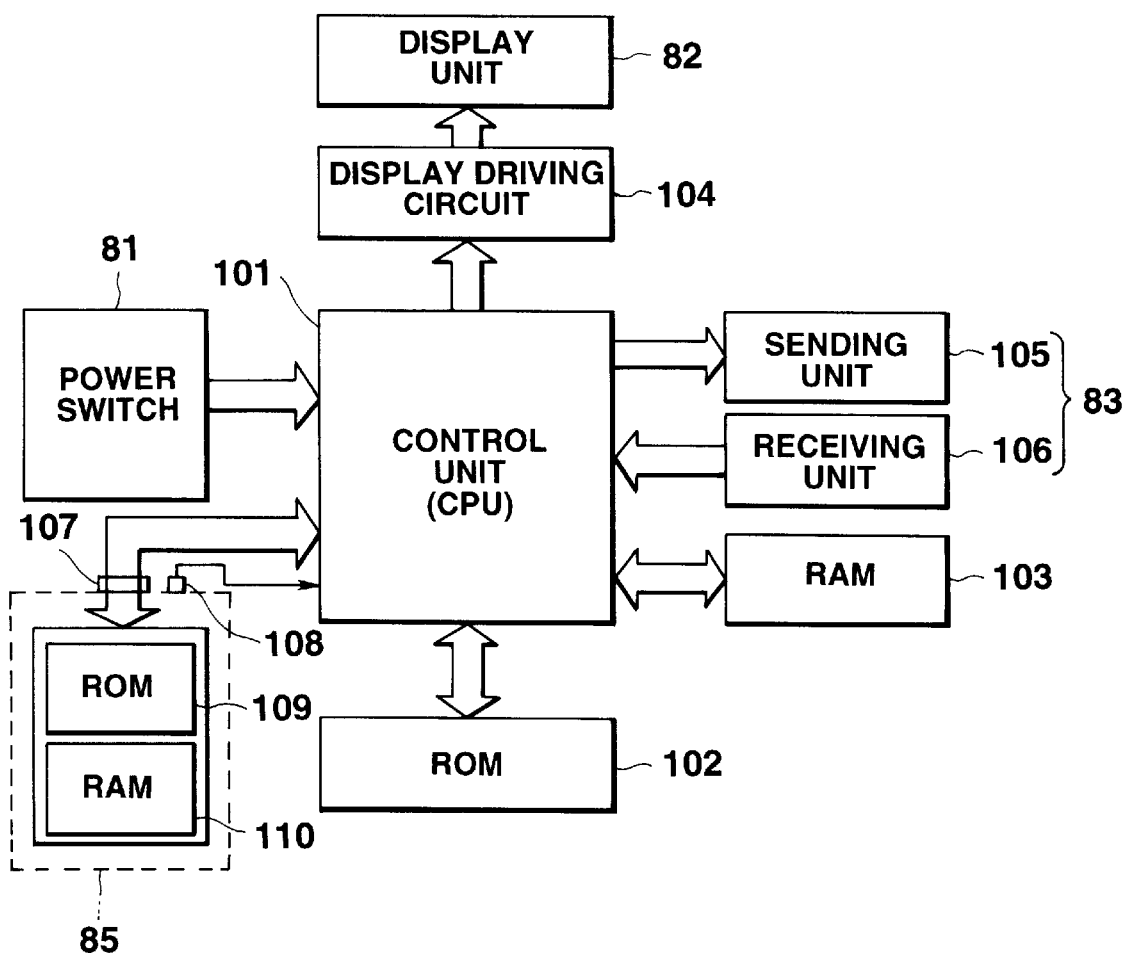
FIG. 19 is a circuit diagram of the display device 63 of FIG. 16.

The display device 63 is designed to be used primarily with the electronic calculator 61. As shown in FIG. 19, the display device 63 is provided with a control unit 101, a power switch 81, ROM 102, RAM 103, a display driving circuit 104, a sending unit 105, a receiving unit 106, an IC card terminal 107, and a microsensor 108. These power switch 81, ROM 102, RAM 103, display driving circuit 104, sending unit 105, receiving unit 106, IC card terminal 107, and microsensor 108 are connected to the control unit 101. A display unit 82 is connected to the display driving circuit 104. The IC card terminal 107 is electrically connected with the IC card 85 received in the IC card receiving slot 84. The IC card 85 includes the ROM 109 and the RAM 110.

The display unit 82 has a transparent type liquid crystal display element. The control unit 101 has a central processing unit (CPU) and its peripheral circuits, and controls entire operation of the display device 63.

In the ROM 109 of the IC card 85 are stored data necessary for executing functions of the respective first to fourth modes. The RAM 110 of the IC card 85 has a structure substantially similar to the RAM 93 of the electronic calculator 61.

The display driving circuit 104 displays display data stored in the display buffer in the RAM 103 on the display unit 82 under control of the control unit 101.

The sending unit 105 transmits data supplied from the control unit 101 using the infrared ray communication. The receiving unit 106 receives infrared ray data transmitted thereto, and sends same to the control unit 101.

The ROM 109 of the IC card 85 stores a control program and fixed data for executing functions in the respective first to eighth mode. The RAM 110 has eight memory areas (a first mode memory area to an eighth mode memory area) for executing functions in the respective modes.

Figure 20:
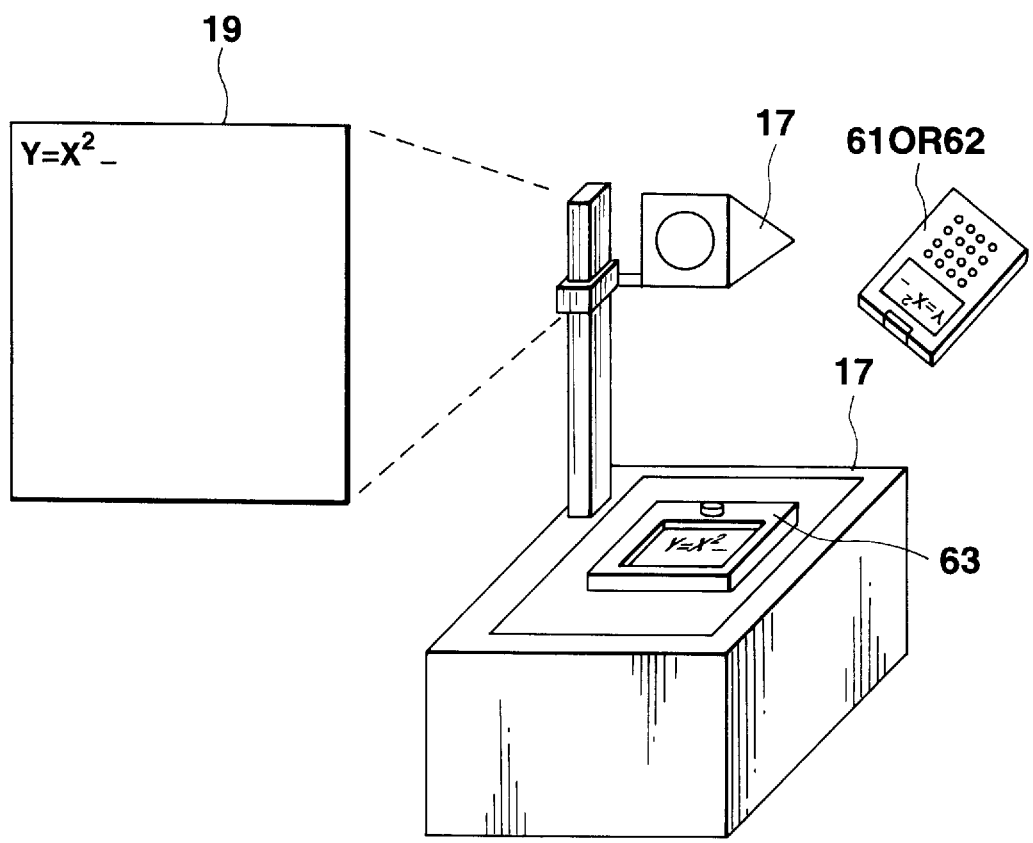
FIG. 20 is a view showing the second embodiment of the electronic apparatus in used.

FIG. 20 is a view showing the electronic apparatus in use. As shown in FIG. 20, the display device 63 is mounted on the top of an overhead projector 17, and an indication displayed on the display device 63 is enlarged and projected onto the screen 19 by the overhead projector 17.

The user operates the electronic calculator 61 or 62 to display on the display unit 71 his (her) desired numbers, characters, a mathematic function, results of calculations, a graph, a table and so on. The compact size electronic calculator 61 or 62 transmits input data (data not yet processed, such as numerical data and function data) through the communication unit 72 thereof to the communication unit 83 of the display device 63. Receiving data, the display device 63 sends back a safe receipt code to the electronic calculator 61 or 62. In response to the safe receipt code, the electronic calculator 61 or 62 executes a process corresponding to the inputted data. After sending the safe receipt code, the display device 63 executes a data process corresponding to the received data, and displays an image similar to that displayed by the electronic calculator 61 or 62.

The electronic calculator 61 or 62 can be solely used independently of the display device 63. A communication on/off key F3 in the key input 73 controls a communication function of the electronic calculator 61 or 62. When the electronic calculator 61 or 62 is used in combination with the display device 63, the flag G is set in the communication flag register 933 in the RAM 93. When the electronic calculator 61 or 62 is used alone independently of the display device 63, the flag G is reset in the communication flag register 933 in the RAM 93.

Now, operation of the electronic apparatus with the above structure will be described with reference of FIGS. 21 and 22.

Figure 21:
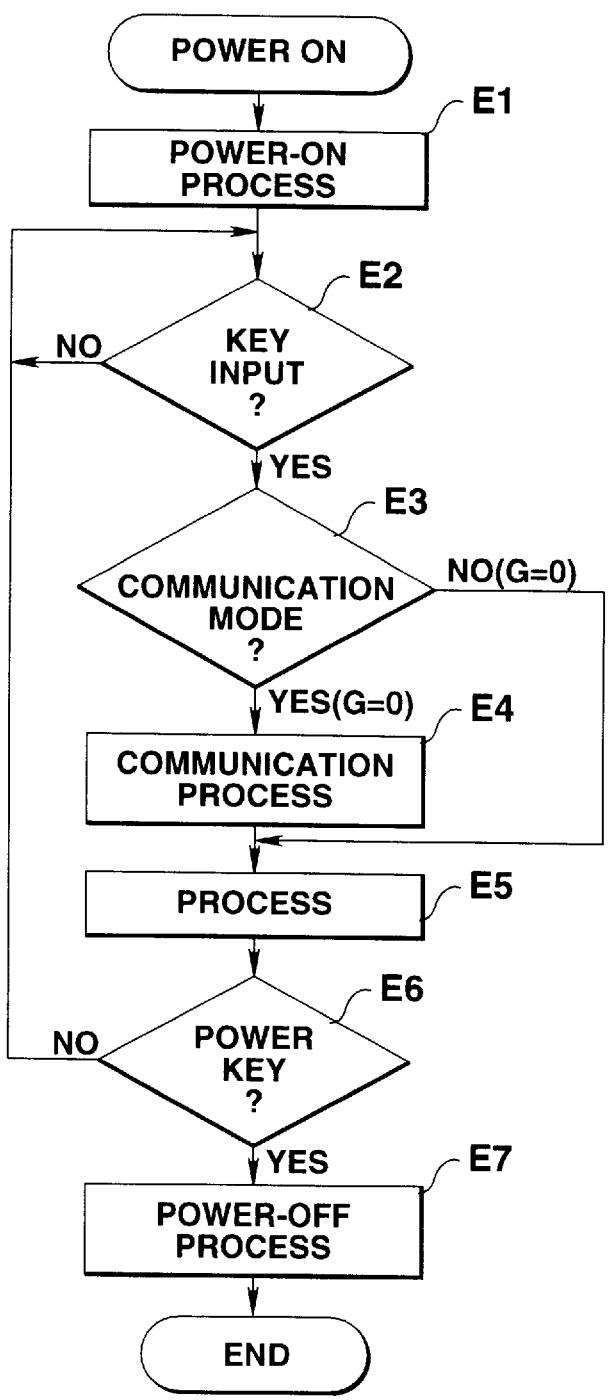
FIG. 21 is a flowchart of operation of the compact size electronic calculator of FIG. 16.
Figure 22:
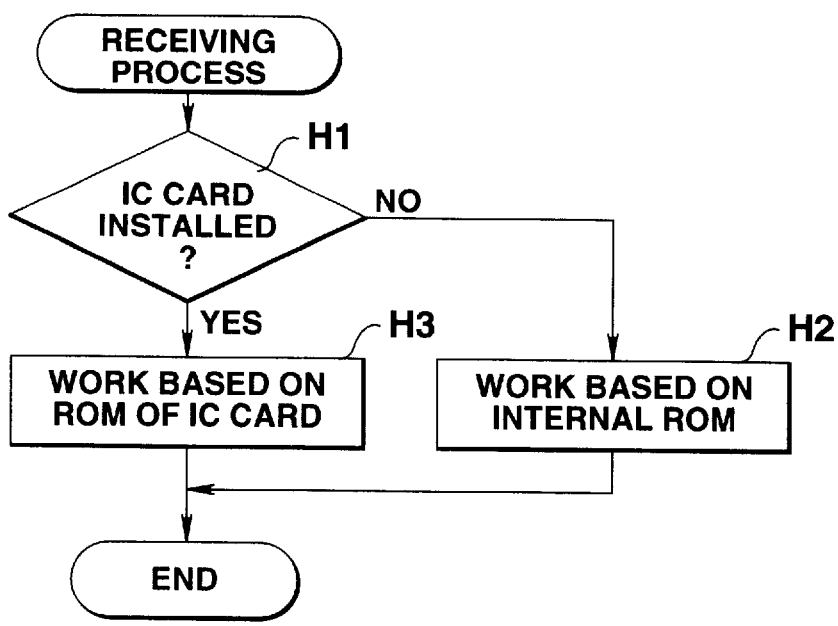
FIG. 22 is a flowchart of operation of the display device of FIG. 16.

When the electronic calculator 61 or 62 is turned on, then a power-on process is executed at step E1 of FIG. 21. The electronic calculator 61 and 62 perform similar operation so that only the operation of the electronic calculator 61 will be described.

The control unit 91 waits for a key input at step E2. Receiving the key input, the control unit 91 judges at step E3 whether the flag G stored in the communication flag register 933 has been set to "1", i.e., whether a mode has been set in which the electronic calculator 61 is used in combination with the display device 63.

When G=1 at step E3, the electronic calculator 61 sends an inputted key code from the sending unit 95 thereof to the receiving unit 106 of the display device 63, and receives a safe receipt code from the sending unit 55 of the display device 63 at step E4.

When G=0 at step E3, the electronic calculator 61 executes a process in the mode in response to the inputted data at step E5. For instance, when a key is operated with the main menu (mode selecting indication) being displayed as shown in FIG. 16, an operation mode is set. When a key is operated in the operation mode, numeral data, function data or variable data is inputted, operation is performed, and a display process thereof is executed. When the communication mode key is operated, the flag G is set to "1" and the communication mode is set.

Then, it is judged at step E6 whether the power key is operated. When YES at step E6, then a power-off process is executed at step E7. On the other hand, when the power key in not operated, the operation returns to step E2.

Meanwhile, when the power switch 81 of the display device 63 is turned on, the control unit 101 judges depending on a signal from the microprocessor 108, at step H1, whether the IC card 85 is inserted into the IC card receiving slot 84.

When the IC card 85 is not inserted into the slot 84, the control unit 101 works in accordance with control information stored in the ROM 102 of the display device 63 at step H2. The ROM 102 which is designed for the electronic calculator 61 stores control information for performing the functions in the first to fourth mode. Therefore, the display device 63 responds to all the functions of the electronic calculator 61 but does not respond to the functions in the fourth to eighth mode of the electronic calculator 62.

Therefore, for example, when the user selects the first mode of the electronic calculator 61 or 62 and executes a process in the first mode, then the first function is selected and the corresponding process is executed in the display device 63. When the user selects the fifth mode of the electronic calculator 62 and executes a process in the fifth mode, then the selected fifth mode is informed to the display device 63, but the ROM 102 of the display device 63 does not supports the fifth mode, and, therefore, the display device 63 does not respond to the informed fifth mode.

When the IC card 84 is in the slot 84, the control unit 101 of the display device 63 works in accordance with the control information stored in the ROM 109 of the IC card 85 at step H3. The ROM 109 and the RAM 110 in the IC card 85 support all the first to eighth mode. Therefore, the display device 63 works responsibly to all the functions of the electronic calculators 61 and 62.

Now, specific operation of the electronic calculators 61 and 62 shown in FIG. 21 will be described in accordance with the flow chart of FIG. 23.

Figure 23:
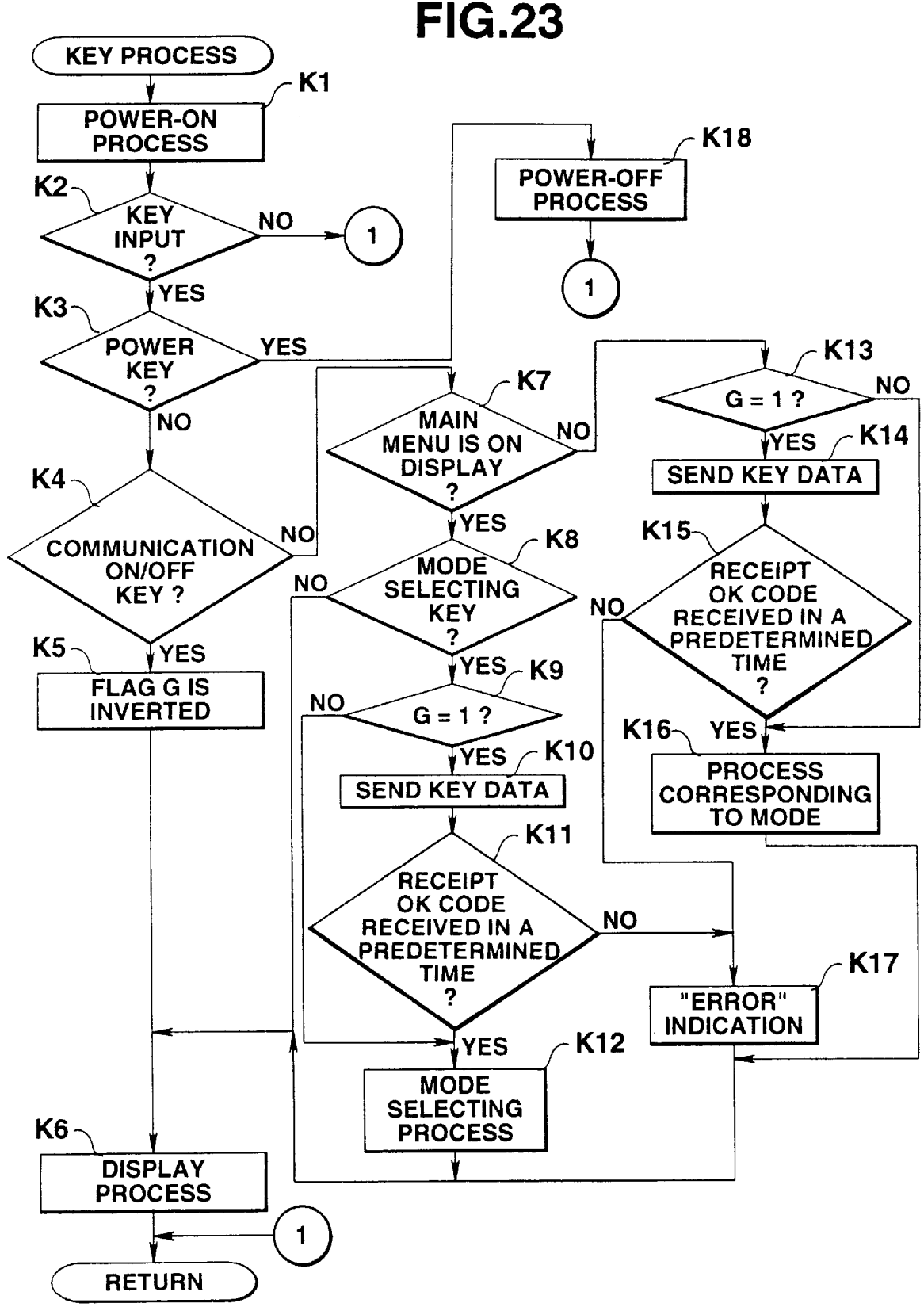
FIG. 23 is a flowchart of specific processes in the compact size electronic calculator.

When the power switch is turned on, the power-on process is executed at step K1 of FIG. 23. The control unit 91 waits for a key input at step K2.

When it is determined at step K2 that a key has been operated, it is judged at step whether the power switch has been operated. When the power switch has been operated, a power-off process is executed at step K18.

When it is determined at step K2 that a key other than the power switch has been operated, the operation advances to step K4, where a communication on/off key F3 has been operated. When YES at step K4, the flag G in the communication flag register 933 is inverted at step K5. Then, the display process is executed at step K6, and the operation returns to step K2 again.

When it is determined at step K4 that the communication on/off key F3 has not been operated, the operation goes to step K7, where it is judged from the value of the mode register 932 whether the main menu (operation mode selecting indication) is on display as shown at (A) or (B) in FIG. 16.

When the main menu is on display, it is judged at step K8 whether the mode selecting key (the cursor key, the numeral key or the execution key) has been operated.

When the mode selecting key has not been operated, the operation advances to step K6, where the display process is executed. When it is determined at step K8 that the mode selecting key has been operated, it is judged at step K9 whether G=1 is true. When G=1 is true at step K9, key data representing the input key is sent through the sending unit 95 to the display device 63 using the infrared ray communication at step K10. Then, at step K11, it is judged whether the receiving unit 96 has received a receipt OK code from the display device 63 within a predetermined time period. When YES at step K11 or when it is determined at step K9 that G=0 is true, the mode selecting process is operated at step K12.

When it is determined at step K7 that the main menu is not on display, i.e., when the operation mode has been set, it is judged at step K13 whether G=1 is true. When G=1 is true at step K13, key data representing the input key is sent through the sending unit 95 to the display device 63 using the infrared ray communication at step K14. Then, at step K15, it is judged whether the receiving unit 96 has received a receipt OK code from the display device 63 within the predetermined time period. When YES at step K15 or when it is determined at step K13 that G=0 is true, a process corresponding to the set mode is operated at step K16, and the result of the process is displayed in the display process at step K6.

When it is determined at step K11 or K15 that the receipt OK code has not been received within the predetermined time period, the indication of "ERROR" is displayed for the predetermined time period at step K17, and the last indication is displayed at step K6 again.

Now, the processes to be executed by the display device 63 at steps H2 and H3 in FIG. 22 will be described referring to FIG. 24.

Figure 24:
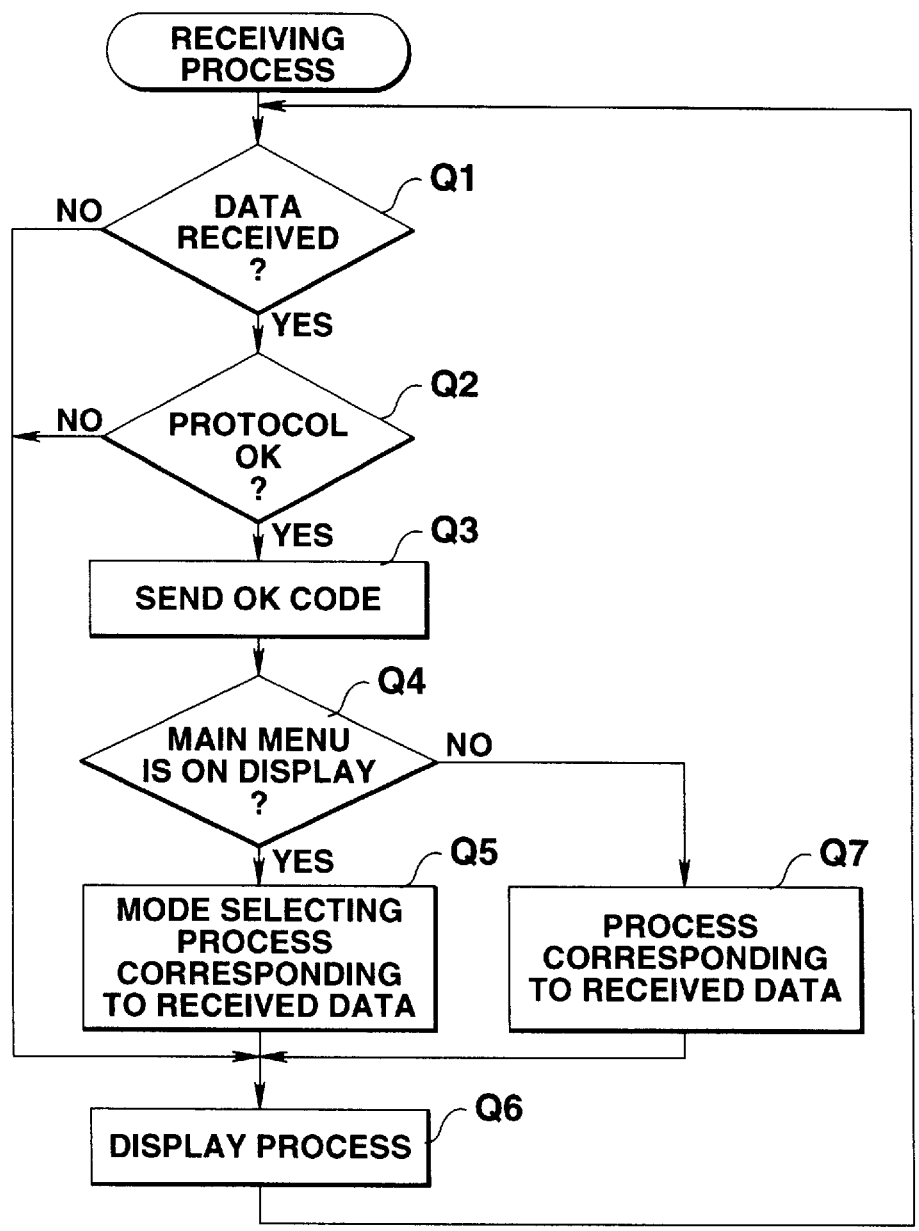
FIG. 24 is a flowchart of specific processes in the display device.

In the display device 63, the control unit 101 judged at step Q1 in FIG. 24 whether any data has been received. When it is determined at step Q1 that no data has been received, the operation advances to step Q6, where an indication of "WAITING FOR DATA" is displayed. When it is determined at step Q1 that data has been received, the operation advances to step Q2, where the control unit 101 judges protocol of the received data at step Q2 to determine if the judged protocol coincides with the communication protocol thereof and to determine if the version of the protocol of the received data coincides with the communication protocol thereof. When the protocol of the received data coincides with the communication protocol or the version of the protocol of the received data coincides with the communication protocol, the display device 63 sends an OK code through the sending unit 105 to the electronic calculator 61 or 62 at step Q3.

The display device 63 may be arranged not to send back the receipt OK code when the version of the protocol of the received data does not coincide with the communication protocol, or, for instance, when the electronic calculator 62 supports the first mode to eighth mode and the display device 63 supports only the first mode to fourth mode.

Then, the operation goes to step Q4, where it is judged whether the main menu is on display. When the main menu is on display, the operation mode selecting process is executed, at step Q5, based on the received data in a manner similar to as described at step K12. The selected operation mode is stored in the mode register the RAM 103 when the IC card 85 is not received in the receiving slot. The selected operation mode is stored in the mode register the RAM 110 when the IC card 85 is received in the receiving slot. Then, the display process corresponding to the selected mode is executed at step Q6, and the operation returns to step Q1 again.

When it is determined at step Q4 that the main menu is not on display, the process corresponding to the operation mode is executed based on the received data at step Q7. When the IC card 85 is not received in the receiving slot, the working area of the RAM 103 is used meanwhile when the IC card 85 is received in the receiving slot, the working area of the RAM 110 is used. Then, the display process corresponding to the executed process is executed at step Q6, and the operation returns to step Q1 again.

Figure 25:
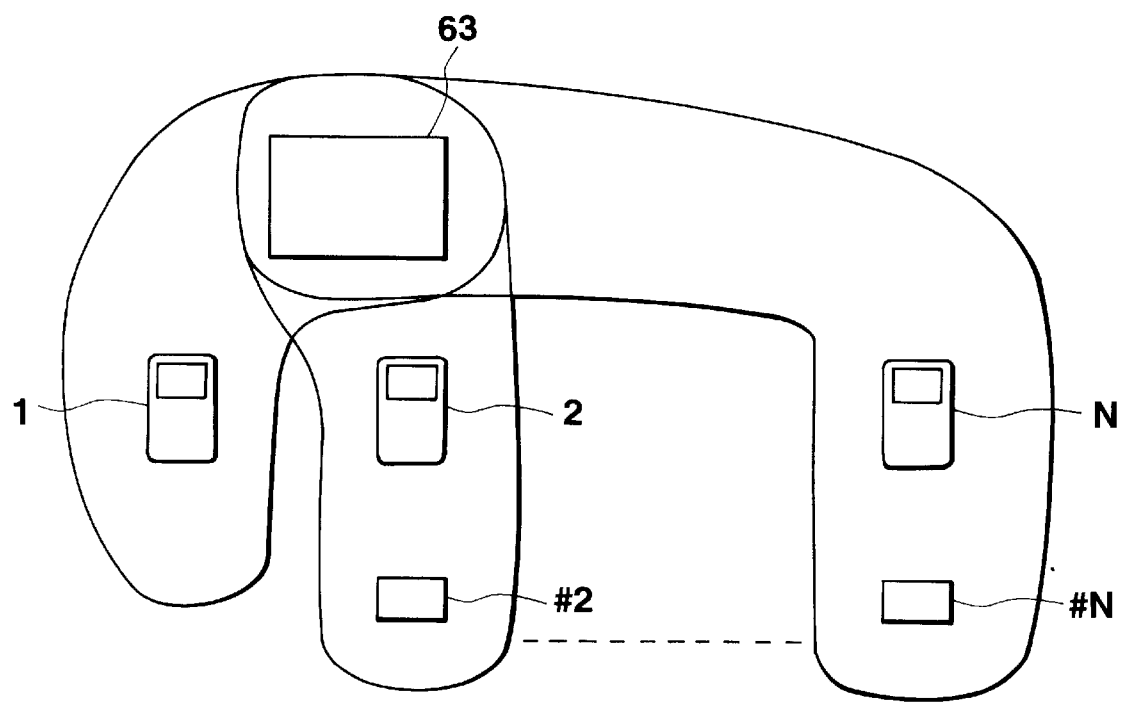
FIG. 25 is a view showing various combinations of the electronic calculator and the display device.

In the above second embodiment of the electronic apparatus of the present invention, the IC card 85 is inserted into the receiving slot of the display device 63 to extend the function of the display device 63, Therefore, as shown in FIG. 25, a combination of an electronic calculator 1 and a display device 3, a combination of the display device 3, an electronic calculator 2 and an IC card #2, and a combination of the display device 3, an electronic calculator N and an IC card #N may be used depending on the required functions.

In case that the user has the electronic apparatus including the electronic calculator 2 and the display device 3, the user can extend the function of his (her) electronic apparatus by purchasing an IC card to used with the his (her) electronic calculator 2. Therefore, in case of a model change of the electronic apparatus, an economical burden to the user can reduced.

Further, in a study meeting, attendants can join a discussion by using the present electronic apparatus 63 with an IC card installed therein, which IC card supports a function necessary for the attendants.

THIRD EMBODIMENT

Now, a third embodiment of the electronic apparatus of the present invention will be described.

In the second embodiment of the apparatus of the present invention, the display device 63 with the IC card 85 installed therein works fully dependently on control information stored in the ROM 109 and the RAM 110 in the IC card 85 but not on information stored in the internal ROM 102, and does not use the RAM 103, resulting in that the ROM 102 and the RAM 103 are not used efficiently. Following modification to the electronic apparatus will be effective. That is, only control information concerning additional functions is stored in the ROM 109 of the IC card, and the RAM 110 is provided with a working area concerning the additional functions. The display device 63 may be arranged such that the device 63 will work depending on the control information stored in both the internal ROM 102 and the ROM 109 of the IC card. The electronic apparatus with above structure will be described hereafter.

An electronic calculator and a display device have substantially similar structures to the electronic calculators 61 and 62 and the display device 63 shown in FIGS. 17–19, respectively, except that in an internal ROM are stored control informations for selecting executing the first mode to the fourth mode and in ROM of the IC card are control informations for selecting and executing the fifth mode to the eighth mode, and, further, in RAM of the IC card are stored information for executing the fifth mode to the eighth mode.

Operation of the third embodiment of the electronic apparatus of the present invention will be described referring to FIG. 26.

Figure 26:
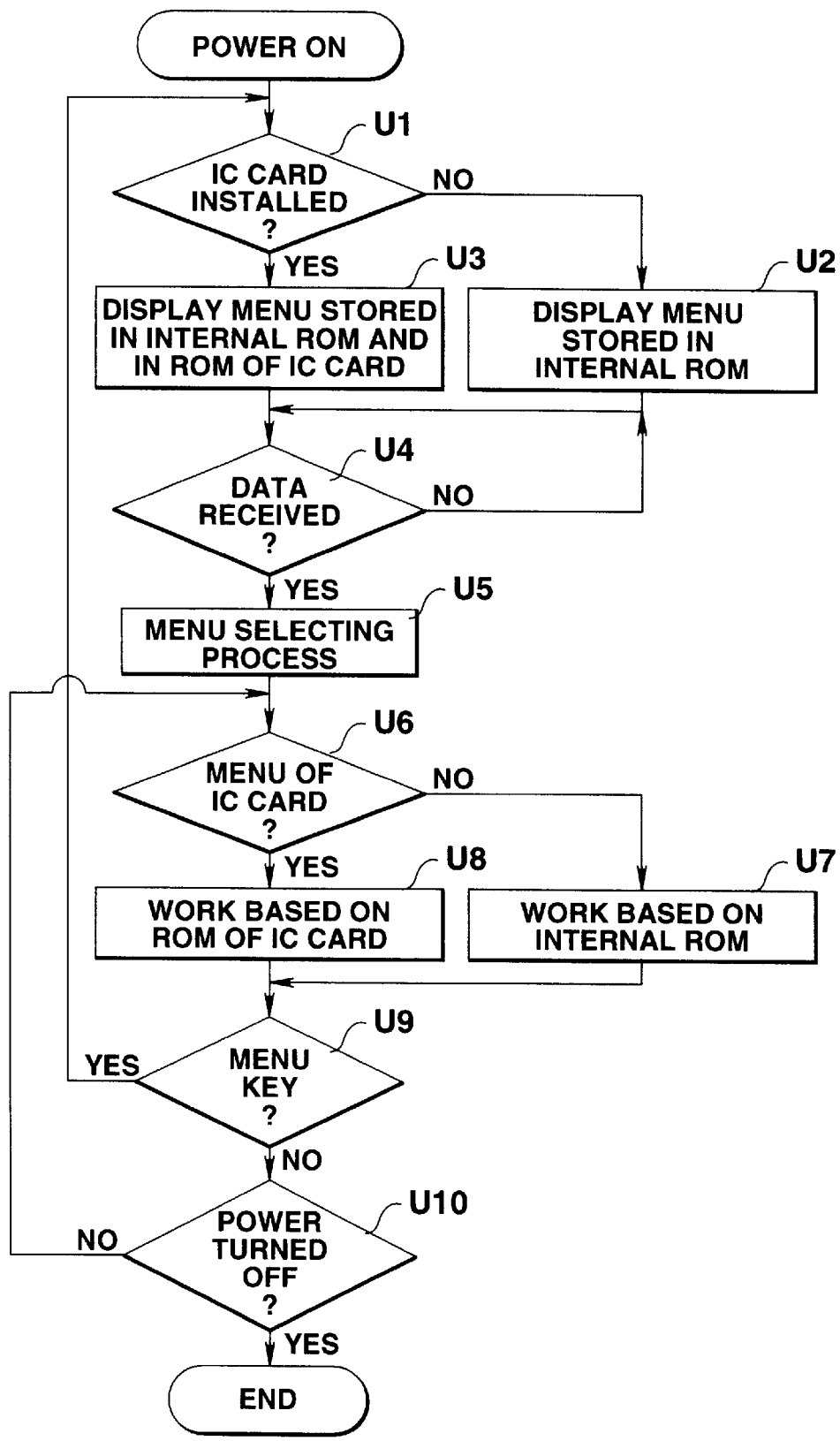
FIG. 26 is a flowchart of processes executed by a display device in a third embodiment of the electronic apparatus of the invention.

When the power switch 81 is turned on, the control unit 101 of the display device judges from a signal sent from the microsensor 108 at step U1 of FIG. 26 whether the IC card 85 is installed in the receiving slot. In case that the IC card 85 is not installed, the menu stored in the internal ROM 102, i.e., the operation mode selecting menu is displayed at step U2 for selecting one operation mode among the first mode to the fourth mode.

In case that the IC card 85 is installed, the operation mode selecting menu stored in the internal ROM 102 and the operation mode selecting menu stored in the ROM of the IC card are displayed side by side at step U3 as shown at (B) in FIG. 16. Then, the display device 63 waits for data sent from the electronic calculator 61 or 61 at step U4.

When the user selects some operation mode by using the electronic calculator 61 or 62, the selected operation mode is informed to the display device 63 through the communication units 72 and 83. The control unit 101 of the display device 63 selects the informed operation mode, and effects a setting for executing a process in the selected operation mode at step U5. Then, the control unit 101 judges the selected operation mode at step U6 to determine if the operation mode is displayed in the menu stored in the IC card 85. When the menu is not one that is displayed in the menu stored in the IC card 85, the control unit 101 works in accordance with the control information stored in the internal ROM 102 at step U7. When the menu is one that is displayed in the menu stored in the IC card 85, the control unit 101 works in accordance with the control information stored in the ROM 109 of the IC card 85 at step U8.

When a key is operated for displaying the menu thereafter at step U9, the operation returns to step U1. When a key is not operated to displaying the menu, it is judged at step U10 whether the power switch 81 is operated. When the power switch 81 is not operated, the operation returns to step U6. When the power switch 81 is operated, then the power-off process is executed at step U11.

In the third embodiment of the electronic apparatus of the present invention, the display device 63 with no IC card 83 installed therein displays on the display unit 83 the menu for selecting one of the first mode to fourth mode similarly in the second embodiment (steps U1, U2). When the user operates the electronic calculator 61 or 62 to select, for example, the first operation mode, the first operation mode is selected in the display device 63 in accordance with control data in the internal ROM 102, and then the corresponding process is executed. Meanwhile, when the user operates the electronic calculator 62 to select the fifth operation mode, the selected fifth operation mode is informed to the display device 63. Since the control data in the internal ROM 102 does not support the fifth function, the display device 63 ignores the informed fifth operation mode at step U5.

When the user operates the electronic calculator 62 with the IC card 85 installed therein to select the sixth operation mode, the display device 63 selects the sixth operation mode in accordance with control data in the ROM 109 at step U5, and executes processes in response to operated keys at step U8.

In the third embodiment, the display device 63 which is placed on the top of the overhead projector 17 has been described, but the display device may be arranged to be mounted in the overhead projector. The present invention is not limited to those to be used with the overhead projector, but may be used with other apparatus.

In the third embodiment, a key board is used for inputting data, and data to be processed therein are key data, but any data will be used. In other words, data are inputted to the compact size electronic calculator by using a pointing device such as a mouse, a thumb ball, an electromagnetic pen and an optical pen, these data may be used. The electronic calculator is provided with a tablet for inputting coordinates, data inputted through the tablet may be also used.

Further, in the above embodiment, the infrared ray communication has been described, but a communication using light, super sonic wave, an electromagnetic wave may be used. Data are transmitted effectively in series but may be sent in parallel.

What is claimed is:

1. An electronic calculating apparatus comprising:
   an electronic calculator; and
   a display device,
   wherein:
   said electronic calculator comprises:
      input means for inputting data;
      sending means for sending data inputted by said input means using a radio frequency wave;
      first processing means for performing an operation based on the data inputted by said input means; and
      first display means for displaying a result of the operation performed by said first processing means, and
   wherein:
   said display device comprises:
      receiving means for receiving data sent from said sending means of the electronic calculator;
      second processing means for performing an operation which is substantially the same as the operation performed by said first processing means of the electronic calculator; and
      second display means having a liquid crystal display unit of a transparent type, for displaying on the liquid crystal display unit of a transparent type a result of the operation performed by said second processing means.

2. An electronic calculating apparatus according to claim 1, wherein:
   said input means comprises:
   detecting means for detecting an input operation performed by a user to generate detection data corresponding to the detected input operation; and
   first data generating means for generating data corresponding to the detection data generated by said detecting means;
   said first processing means performs an operation based on the data generated by said first data generating means;
   said sending means comprises detection data sending means for sending the detection data generated by said detecting means;
   said receiving means comprises:
   detection data receiving means for receiving the detection data sent by said detection data sending means; and
   second data generating means for generating data corresponding to the detection data received by said detection data receiving means; and
   said second processing means performs an operation based on the data generated by said second data generating means, which operation is substantially the same as the operation performed by said first processing means.

3. An electronic calculating apparatus according to claim 1, wherein:
   said input means comprises:
   key input means including plural keys;
   key detecting means for detecting a key operation performed on said key input means by a user to generate key data corresponding to the detected key operation; and
   first data generating means for generating data corresponding to the key data generated by said key detecting means;

said first processing means performs an operation based on the data generated by said first data generating means;

said sending means comprises key data sending means for sending the key data generated by said key detecting means;

said receiving means comprises:

key data receiving means for receiving the key data sent by said key data sending means; and second data generating means for generating data corresponding to the detection data received by said detection data receiving means; and said second processing means performs an operation based on the data generated by said second data generating means, which operation is substantially the same as the operation performed by said first processing means.

4. An electronic calculating apparatus according to claim 1, wherein:

said input means comprises function data input means for inputting function data;

said first processing means comprises first drawing means for performing an operation based on the function data inputted by said function data input means to draw a graph of the inputted function data;

said first display means displays the graph drawn by said first drawing means;

said second processing means comprises second drawing means for performing an operation based on the data received by said receiving means, which operation is substantially the same as the operation performed by said first drawing means, to draw a graph of the received data; and said second display means displays the graph drawn by said second drawing means on the liquid crystal display unit of a transparent type.

5. An electronic calculating apparatus according to claim 1, wherein:

said display device further comprises:

first judging means for judging whether said receiving means receives data sent from said electronic calculator; and response data sending means for sending back response data to said electronic calculator when said first judging means determines that said receiving means has received data sent from said electronic calculator, and said electronic calculator further comprises:

response data receiving means for receiving response data sent from said response data sending means;

second judging means for judging whether said response data receiving means receives the response data sent from said response data sending means; and process controlling means for controlling said first processing means so as to perform an operation based on the data inputted by said input means every time the second judging means determines that said response data receiving means receives the response data sent from said response data sending means, whereby said electronic calculator and said display device work in synchronism with each other.

6. An electronic calculator according to claim 1, wherein:

said sending means sends data inputted by said input means using an infrared ray.

7. An electronic calculator according to claim 1, wherein:

said display device is incorporated in an overhead projector.

8. An electronic calculating apparatus for use with an overhead projector, comprising:

an electronic calculator; and a display device to be used with the overhead projector, wherein:

said electronic calculator comprises:

input means for inputting data;

sending means for sending data inputted by said input means using a radio frequency wave;

first processing means for performing an operation based on the data inputted by said input means; and first display means for displaying a result of the operation performed by said first processing means, and wherein:

said display device comprises:

first memory for storing control information; second memory detachably installed in said display device, for storing control information;

receiving means for receiving data sent from said sending means of the electronic calculator;

second processing means for performing an operation based on the data received by said receiving means and the control information stored in said first memory means when said second memory is not installed in said display device, and for performing an operation based on the data received by said receiving means and the control information stored in one of said first memory and said second memory; and second display means having a liquid crystal display unit of a transparent type, for displaying on the liquid crystal display unit of a transparent type a result of the operation performed by said second processing means.

9. An electronic calculating apparatus according to claim 8, wherein:

said input means comprises:

detecting means for detecting an input operation performed by a user to generate detection data corresponding to the detected input operation; and first data generating means for generating data corresponding to the detection data generated by said detecting means;

said first processing means performs an operation based on the data generated by said first data generating means;

said sending means comprises detection data sending means for sending the detection data generated by said detecting means;

said receiving means comprises:

detection data receiving means for receiving the detection data sent by said detection data sending means; and second data generating means for generating data corresponding to the detection data received by said detection data receiving means; and said second processing means performs an operation based on the data generated by said second data generating means.

10. An electronic calculating apparatus according to claim 8, wherein:

said input means comprises:

key input means including plural keys;

key detecting means for detecting a key operation performed on said key input means by a user to generate key data corresponding to the detected key operation; and first data generating means for generating data corresponding to the key data generated by said key detecting means;

said first processing means performs an operation based on the data generated by said first data generating means;

said sending means comprises key data sending means for sending the key data generated by said key detecting means;

said receiving means comprises:

key data receiving means for receiving the key data sent by said key data sending means; and second data generating means for generating data corresponding to the detection data received by said detection data receiving means; and said second processing means performs an operation based on the data generated by said second data generating means.

11. An electronic calculating apparatus according to claim 8, wherein:

said input means comprises function data input means for inputting function data;

said first processing means comprises first drawing means for performing an operation based on the function data inputted by said function data input means to draw a graph of the inputted function data;

said first display means displays the graph drawn by said first drawing means;

said second processing means comprises second drawing means for performing an operation based on the data received by said receiving means, which operation is substantially the same as the operation performed by said first drawing means, to draw a graph of the received data; and said second display means displays the graph drawn by said second drawing means on the liquid crystal display unit of a transparent type.

12. An electronic calculating apparatus according to claim 8, wherein:

said display device further comprises:

first judging means for judging whether said receiving means receives data sent from said electronic calculator; and response data sending means for sending back response data to said electronic calculator when said first judging means determines that said receiving means has received data sent from said electronic calculator, and said electronic calculator further comprises:

response data receiving means for receiving response data sent from said response data sending means;

second judging means for judging whether said response data receiving means receives the response data sent from said response data sending means; and process controlling means for controlling said first processing means so as to perform an operation based on the data inputted by said input means every time the second judging means determines that said response data receiving means receives the response data sent from said response data sending means, whereby said electronic calculator and said display device work in synchronism with each other.

13. An electronic calculator according to claim 8, wherein:

said sending means sends data inputted by said input means using an infrared ray.

14. An electronic calculator according to claim 8, wherein:

said display device is incorporated in an overhead projector.

15. An electronic calculator according to claim 8, wherein:

said second memory comprises an IC card.

16. An electronic calculator according to claim 8, wherein:

said display device further comprises:

control data detecting means for, when said second memory is installed in said display device, detecting the control information stored in said second memory; and control data display means for displaying the control information detected by said control data detecting means.

* * * * *